United States Patent
Carr et al.

(10) Patent No.: US 9,799,102 B2
(45) Date of Patent: Oct. 24, 2017

(54) SMOOTHING IMAGES USING MACHINE LEARNING

(71) Applicant: Adobe Systems Incorporated, San Jose, CA (US)

(72) Inventors: Nathan A. Carr, San Jose, CA (US); Zhaowen Wang, San Jose, CA (US); Duygu Ceylan, Mountain View, CA (US); I-Chao Shen, Vancouver (CA)

(73) Assignee: Adobe Systems Incorporated, San Jose, CA (US)

( * ) Notice: Subject to any disclaimer, the term of this patent is extended or adjusted under 35 U.S.C. 154(b) by 57 days.

(21) Appl. No.: 14/957,539

(22) Filed: Dec. 2, 2015

(65) Prior Publication Data

US 2017/0161876 A1    Jun. 8, 2017

(51) Int. Cl.
*G06T 5/00* (2006.01)
*G06T 7/00* (2017.01)
*G06T 3/40* (2006.01)
*G06T 19/20* (2011.01)
*G06K 9/62* (2006.01)

(52) U.S. Cl.
CPC ............ *G06T 5/002* (2013.01); *G06K 9/6256* (2013.01); *G06T 3/4053* (2013.01); *G06T 7/0085* (2013.01); *G06T 19/20* (2013.01); *G06T 2207/20081* (2013.01); *G06T 2207/20182* (2013.01); *G06T 2207/20192* (2013.01)

(58) Field of Classification Search
CPC ..... G06T 5/002; G06T 3/4053; G06T 7/0085; G06T 19/20; G06K 9/6256
See application file for complete search history.

(56) References Cited

U.S. PATENT DOCUMENTS

| | | | |
|---|---|---|---|
| 9,256,920 B1* | 2/2016 | Choudhury | |
| 9,508,135 B1* | 11/2016 | Truong | G06T 5/20 |
| 9,600,861 B2* | 3/2017 | Liang | G06T 3/4053 |
| 2002/0012464 A1* | 1/2002 | Han | G06T 3/403 |
| | | | 382/199 |

(Continued)

OTHER PUBLICATIONS

Lorensen et al "Marching Cubes: A high resolution 3d Surface construction algorithm" SIGGRAPH 1987.*

(Continued)

*Primary Examiner* — Sean Motsinger
(74) *Attorney, Agent, or Firm* — Wolfe-SBMC

(57) ABSTRACT

Smoothing images using machine learning is described. In one or more embodiments, a machine learning system is trained using multiple training items. Each training item includes a boundary shape representation and a positional indicator. To generate the training item, a smooth image is downscaled to produce a corresponding blocky image that includes multiple blocks. For a given block, the boundary shape representation encodes a blocky boundary in a neighborhood around the given block. The positional indicator reflects a distance between the given block and a smooth boundary of the smooth image. In one or more embodiments to smooth a blocky image, a boundary shape representation around a selected block is determined. The representation is encoded as a feature vector and applied to the machine learning system to obtain a positional indicator. The positional indicator is used to compute a location of a smooth boundary of a smooth image.

20 Claims, 16 Drawing Sheets

(56) References Cited

U.S. PATENT DOCUMENTS

| | | | |
|---|---|---|---|
| 2004/0017852 A1* | 1/2004 | Garrido | H04N 7/0125 375/240.16 |
| 2007/0041663 A1* | 2/2007 | Cho | G06T 3/4084 382/299 |
| 2012/0219229 A1* | 8/2012 | Springer | G06T 5/003 382/199 |
| 2012/0269445 A1* | 10/2012 | Matsunobu | G06T 3/403 382/199 |
| 2012/0294512 A1* | 11/2012 | Matsuda | G06T 3/4053 382/155 |
| 2012/0328210 A1* | 12/2012 | Fattal | G06T 3/403 382/264 |
| 2013/0016920 A1* | 1/2013 | Matsuda | G06T 3/4053 382/299 |
| 2013/0294544 A1* | 11/2013 | Rossato | G06T 3/403 375/316 |
| 2014/0029823 A1* | 1/2014 | Birkbeck | G06T 7/0081 382/131 |
| 2014/0219524 A1* | 8/2014 | Takeguchi | A61B 6/463 382/128 |

OTHER PUBLICATIONS

Kopf, "Depixelizing Pixel Art", Proceedings of ACM Transactions on Graphics (TOG), vol. 30 Issue 4, Jul. 1, 2011, 8 pages.

Nakashima, "Devoxilizing Voxel Art—A Senior Thesis", Submitted to the Department of Information Science the Faculty of Science, The University of Tokyo, Feb. 2, 2015, 35 pages.

Silva, "Real Time Pixel Art Remasterization on GPUs", Conference on Graphics, Patterns and Images (SIBGRAPI), 2013 26th SIBGRAPI, 2013, 8 pages.

* cited by examiner

Rotational
Symmetry

Reflective Symmetry

SMOOTHING IMAGES USING MACHINE LEARNING

BACKGROUND

Although typical display screens for electronic devices are physically two-dimensional (2D), three-dimensional (3D) content may also be presented by electronic devices, such as to mimic real life scenarios. Accordingly, 3D content has become increasingly more popular and common. However, the steady emergence of 3D content as a prevalent media type has surfaced a number of problems that are faced when working with 3D data. Although solutions for rendering 3D content have matured, software that can simplify the process of creating and editing 3D content continues to elude programmers, even in the presence of decades of research.

One continuing innovative force in the 3D space has been the gaming industry. Researchers have explored a number of technologies that enable people to create and modify in-game content. In one example, participants can build virtual worlds with 3D modeling tools. To be popular, these modeling tools must be simple to use yet offer enough variation to give the participating creator a sense of ownership of the resulting virtual world. Because many game modeling systems are based on templates or institute strict parameters, such game modeling systems typically reduce or control the variability of the models that can be produced.

An alternative approach has been taken recently with the advent of modeling 3D worlds using cubes. These cubes are covered or painted with different textures, such as stone, water, trees, or grass. Gaming or modeling participants can create entire 3D virtual worlds by stacking and otherwise positioning the textured cubes in a 3D grid. A popular version of this type of "modeling game" is called MINECRAFT. By adopting this relatively simplified approach, MINECRAFT enables easy 3D modeling and content creation for people of all ages. A truly engaging aspect of such modeling games is the ability to create 3D digital worlds that a participant can fully customize and electronically inhabit by virtually moving around the 3D digital world. The success of these kinds of modeling games has been enormous and provides empirical evidence that 3D content creation can be brought to the masses in an easy and engaging way.

Using textured cubes and a 3D grid facilitates the 3D creation process. Unfortunately, these same strategies also limit the scope of the types of shapes that can be modeled and therefore reduce the level of realism that is attainable. For example, with a digital world that is built using cubes and a 3D grid, participants cannot create curved organic forms or angled planes. Instead, a virtual world is effectively built with vertical and horizontal planes that produce perpendicular lines, which also results in a jagged appearance for much of the virtual world. This perpendicular lines and jagged appearance lowers the realism and beauty of the virtual worlds that participants spend so many hours creating.

SUMMARY

Smoothing images using machine learning is described. With image smoothing, a blocky image may be converted to a smooth image using a smoothing operation. Instead of relying solely on the inadequate amount of information present in a lower-resolution blocky image to produce a higher-resolution smooth image, information garnered from other, external images is brought to bear on the smoothing operation using a machine learning system. The machine learning system processes the external information such that the system can return smoothing guidance responsive to particular shapes of blocky boundaries of a blocky image. Thus, a shape of a blocky boundary of a blocky image can serve as context for inferring a smooth boundary of a smooth image in a vicinity around the blocky boundary.

To train a machine learning system to facilitate smoothing a blocky image to produce a smooth image, a machine learning training module creates a training set having multiple training items. In one or more embodiments, a training item generated for the set includes at least a pair of associated inputs: a characteristic of a blocky image and a relationship expression. The characteristic of a blocky image that includes multiple blocks is implemented as a boundary shape representation over the multiple blocks in a neighborhood around a selected block. The relationship expression is implemented as an expression of a relationship between the multiple blocks and a smooth boundary of the smooth image that corresponds to the multiple blocks. The relationship expression may include, for example, an indication of a distance between the selected block and the corresponding smooth boundary. To determine characteristics and associated relationship expressions for training purposes, the machine learning training module may downscale or rasterize existing smooth images to produce respective corresponding blocky images, which are then analyzed in relation to the respective smooth images.

To utilize a machine learning system to facilitate smoothing a blocky image to produce a smooth image, an image smoothing module analyzes a blocky image including multiple blocks. In one or more embodiments, a characteristic of the multiple blocks is determined around a selected block, such as a boundary shape representation in a neighborhood around the selected block. The characteristic is encoded into a feature vector that is applied to the machine learning system. In response to the characteristic, the machine learning system returns a relationship expression that expresses a relationship between the multiple blocks and an inferred smooth boundary of the smooth image, such as a positional indicator of a point along the smooth boundary with respect to the selected block. Using multiple characteristics along a blocky boundary, multiple relationship expressions may be obtained from the machine learning system such that the inferred smooth boundary can be constructed. The image smoothing module effectively constructs the smooth image by separately or jointly constructing multiple smooth boundaries.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is presented with reference to the accompanying figures. In the figures, the left-most digit or two digits of a reference number identifies the figure in which the reference number first appears. The use of the same reference numbers in different instances in the description and the figures may indicate similar or identical items. Items represented in the figures may be indicative of one or more items, and thus reference may be made interchangeably to single or plural forms of the items in the description.

DETAILED DESCRIPTION

Overview

Figure 1:
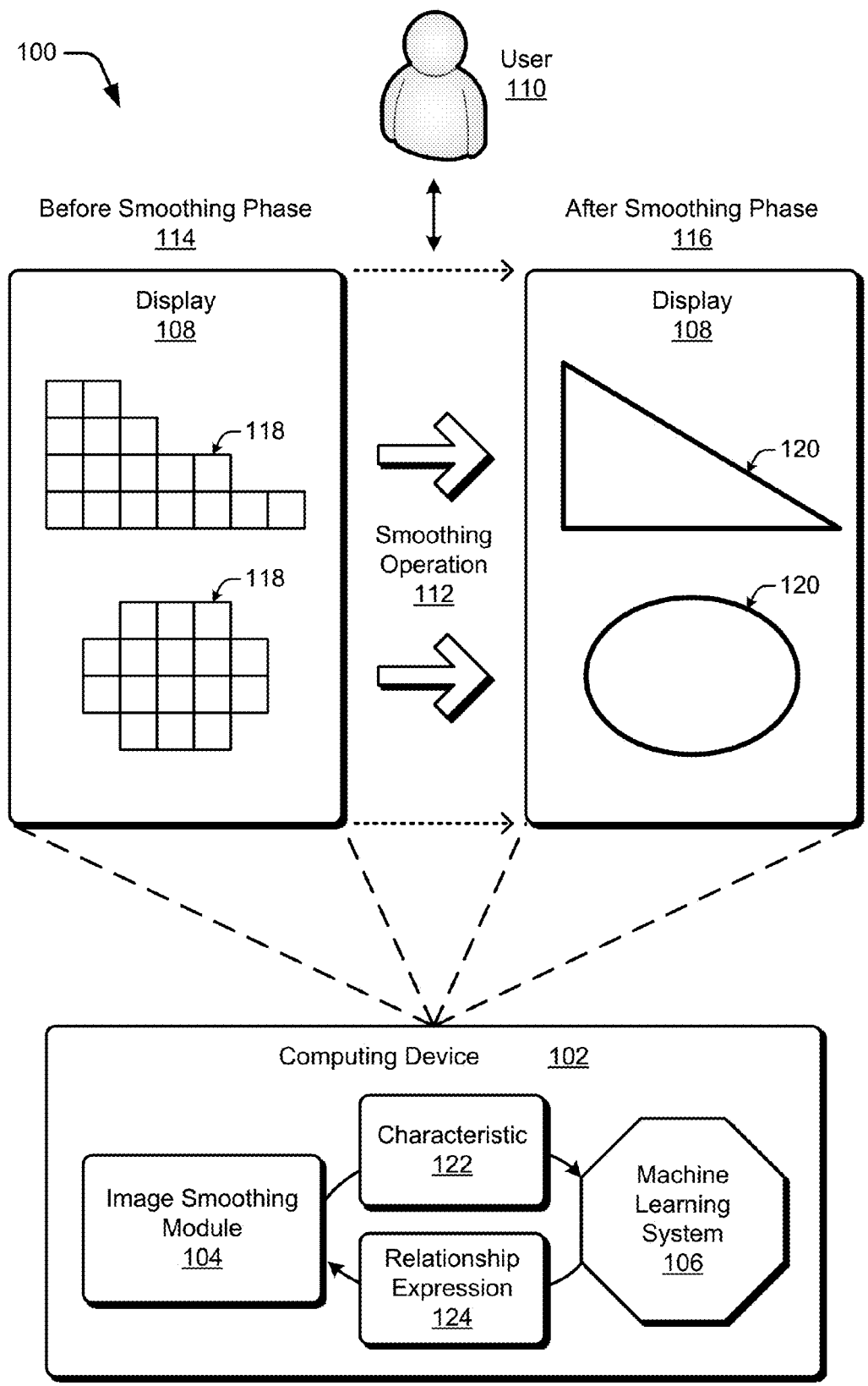
FIG. 1 illustrates an environment for example embodiments that are operable to employ techniques described herein that relate to smoothing images using machine learning.

A computing device typically forms images in a digital environment from a 2D or 3D array of discrete visual units that may be lit by a particular color. For a 2D image, the discrete visual units are called "pixels" for picture elements. For a 3D image, the discrete visual units are called "voxels" for volumetric elements. To encompass both square pixels in a 2D scenario or cubic voxels in a 3D scenario, the term "blocks" is used herein. With modeling games, each of the textured cubes used to build a 3D virtual world may be considered an individual voxel. Modeling game participants are therefore effectively building a 3D virtual world one voxel at a time.

Although modeling games provide an engaging interface for building 3D virtual worlds, the games rely on a 3D grid and textured cubes as the literal building blocks of the virtual worlds. The resulting images are jagged with lines that run only at right angles to each other. Thus, the popularity of such modeling games is one reason an image presented on an electronic device may have a jagged or blocky appearance. However, there are many other reasons. For example, a native source of an image, such as a camera or a scanner, may have a resolution that is inferior compared to a display screen. Also, even if an image is captured at a sufficiently high resolution, a device may downscale the image to a lower resolution to compress a size of the image for storage or transmission purposes.

Furthermore, as technology continues to inexorably march forward, display screen resolutions increase as well. A few years ago, for example, high-definition (HD) images were new and replacing standard-definition (SD) images. Currently, an ultra-high-definition (UHD) resolution at 4K is beginning to replace HD. An HD image that was at the vanguard of screen resolutions a few years ago can now look blocky on a 4K UHD screen. For any of these reasons, an image may have jagged edges and appear blocky to a viewing user.

To improve the appearance of blocky images, including those produced by textured cubes in a 3D digital world, an electronic device may smooth the blocky images at least for display purposes. One option for smoothing blocky images, including those derived from voxels, is to export the blocky voxel content into a 3D modeling package and run conventional smoothing algorithms. Examples of conventional smoothing algorithms include those that perform some kind of averaging and those that perform some amount of filtering, such as additive smoothing and a Kalman filter.

A conventional smoothing algorithm applies a mathematical technique to data of an image. The goal of a smoothing algorithm is to remove at least an appreciable amount of jaggedness in an image. The smoothing algorithm accepts input data representing a portion of the jagged image, performs a mathematical technique on the input data, and outputs replacement data for the smoothed image. The mathematical technique of the smoothing algorithm is an external factor applied to the image being smoothed, but the data used to smooth the image is internally present in the image before the smoothing is performed. Although conventional smoothing algorithms can round off the jagged corners of voxels to thereby produce smoother image content, the conventional smoothing algorithms fail to fully eliminate the jagged contours induced by the voxel grid, in part because no external data is used by the conventional smoothing algorithms.

In contrast, image smoothing using a machine learning system as described herein does rely on external data to facilitate a smoothing process. A smoothing process informed by a machine learning system can remove jagged contours, including those resulting from textured cubes positioned over a 3D grid. Consequently, the simplicity of the voxel-based modeling games can be maintained while enabling creation of a smoother, more life-like output. After training, a machine learning system can operate by outputting an informed or recommended indication that is usable to enhance a smoothing operation in response to at least one feature of a blocky image that is input to the machine learning system. The machine learning system can be trained using external images that already have relatively smooth contours. More specifically, images having precise, or even exact, geometric shape representations may be used to train a machine learning system. Images that are represented or defined with vectors, for instance, have precise geometric shape representations. The information present in these external images having smooth contours is leveraged to predict or infer what smooth shapes are intended by the jagged parts of a blocky image that is to be smoothed.

To build a machine learning system, a training set is created first. Images with precise geometric representations that already have pleasingly-smooth shapes and contours, such as smooth boundaries, are obtained. Easily-available sets of hand-customized black-and-white icons, for instance, may be used. A machine learning training module rasterizes a smooth image of an icon to produce a blocky image. The smooth image of the icon and the blocky image derived from the icon are analyzed to determine a relationship between multiple blocks of a blocky or jagged boundary of the blocky image and a smooth boundary of the smooth image. From an inverse perspective, this relationship reflects an intention by a human mind of how the multiple blocks of the blocky image are intended to look in terms of a corresponding smooth boundary of a smooth image. The machine learning training module encodes the multiple blocks into a boundary shape representation and creates a training item by associating the boundary shape representation with the relationship. Using different portions of different icons, many training items can be created to produce a training set. The training set serves as an external repository of information of how to beautify blocky images into smooth images. The training set is applied to a machine learning system to train the system to facilitate image smoothing.

A trained machine learning system can be used by an image smoothing module to smooth a blocky image to produce a smooth image having smooth boundaries that corresponds to the blocky image. The image smoothing module identifies a portion of a blocky image, such as multiple blocks around a selected block of interest, to determine a boundary shape representation of the blocky image in a neighborhood around the selected block. The boundary shape representation is encoded as a feature vector and applied to the machine learning system, which serves as a storehouse for external information about image smoothing. The machine learning system responds with an indicator of a smooth boundary relative to at least the selected block of interest. A descriptor of a smooth boundary, such as a point along the smooth boundary, can be determined using the selected block and the indicator. Repeating this process produces multiple descriptors along the smooth boundary to define the contours of the smooth boundary and thereby enable the smooth boundary to be constructed by the image smoothing module. Moreover, a precise geometric representation of the smooth boundary may be computed from the multiple descriptors along the smooth boundary. After multiple smooth boundaries are constructed, the image smoothing module can construct the smooth image from the multiple smooth boundaries.

In these manners, a blocky image with jagged boundaries and perpendicular lines can be smoothed to produce a more realistic-looking smooth image with curved and angled lines. For example, images for a 3D virtual world that is built from textured cubes on a 3D grid may be smoothed into aesthetically pleasing views. Using a repository of smooth images, a machine learning system captures information indicative of intended smooth contours, which information is external to the 3D virtual world or a blocky image thereof. The machine learning system provides smoothing guidance in the form of indicators that incorporate a relationship between blocks of a blocky boundary of a blocky image and smooth boundaries of a smooth image. Accordingly, an intended or desired smooth image may be produced from a blocky image using indicators obtained from the machine learning system. As discussed below with reference to the sample images shown in FIG. 15, image smoothing using machine learning can provide a smoother result for object borders of images being smoothed as compared to conventional smoothing algorithms that rely solely on a mathematical technique.

In the following discussion, after some example terminology is set forth, an example environment is described that may employ the techniques described herein. Example embodiment systems and machines are then described, followed by a section explaining example embodiment procedures and processes. The procedures and processes may be performed in the example environment and systems as well as in other environments. However, performance of the example procedures is not limited to the example environment, and the example environment and systems are not limited to performance of the example procedures.

Terminology Examples

Example descriptions or explanations of certain terms as used herein are set forth below. Each term is applicable to one or more, but not necessarily all, embodiments that are presented herein. Some terms are further elucidated using one or more examples.

A "blocky image" refers to an image presented on a display of an electronic device in which individual blocks thereof can be discerned by the human eye. A blocky image can result from content created with a modeling game, from a relatively low-resolution image-capturing device, from compression of image data, from the disparity of resolutions between different generations of display standards, some combination thereof, and so forth. A blocky image includes multiple blocks.

A "block" refers to an individual constituent element of an image that is visible as part of a displayed blocky image. Examples of blocks may include pixels and voxels. Pixels, or picture elements, are an example of 2D blocks. Voxels, or volumetric elements, are an example of 3D blocks. The building blocks of 3D virtual worlds for some modeling games are voxels that are realized in the game as textured cubes.

An "image smoothing operation" refers to a procedure that converts a blocky image to a smooth image. An image smoothing operation can make a jagged blocky image look more natural and life-like or soften a jagged appearance. An image smoothing operation can be considered a technique to de-blockify (e.g., de-pixelate or de-voxelate) a blocky image to produce a smooth image.

A "smooth image" refers to an image presented on a display of an electronic device in which individual blocks thereof cannot be discerned by the human eye or to a presented image in which individual blocks thereof are less discernable by the human eye in comparison to blocks of a corresponding blocky image at a given distance from the display. A smooth image typically has a less jagged appearance as compared to a corresponding blocky image. A smooth image has one or more smooth boundaries. A smooth image, or the smooth boundaries thereof, may be defined using a precise geometric representation.

A "precise geometric representation" refers to a representation of a shape that is not only capable of being smooth, but can also be exact. A precise geometric representation can be realized with a vector representation, an implicit function, a combination thereof, and so forth. With a vector representation of a shape, a geometry of the shape can be fully described by the shape definition at an infinite resolution. The equation of a circle (or sphere), for instance, is a vector representation as it can be converted into a pixel form (or a voxel form) at any resolution, such as 1 k, 2 k, 4 k, SD, SHD, FHD, etc. Other examples of vector shapes in 2D include Bezier bounded content, polygons, or combinations thereof.

Vector shapes in 3D can be represented as triangle or quad meshes, non-uniform rational basis spline (NURBS) patches, subdivision surfaces, a combination thereof, and so forth. Examples of implicit functions, which can also be used to represent shapes precisely, include equations of geometric shapes, like a square, a cylinder, or a paraboloid.

A "boundary" refers to an interface of or a dividing line for an object of an image. A boundary demarcates a region that is part of an object and a region that is not part of the object. Examples of a boundary may include an edge in a 2D environment, a surface in a 3D environment, and combinations thereof. A boundary of a blocky image is referred to as a "blocky boundary," and a boundary of a smooth image is referred to as a "smooth boundary." A smooth boundary may be thought of as being more precise than a blocky boundary. Moreover, a smooth boundary may be so precise as to be effectively exact. A smooth boundary that is defined by a vector representation, for instance, can be scaled to be as precise as is possible at any given resolution. As used herein, an "active block" is lit or colored to represent being germane to or part of an object, and an "inactive block" is dark/unlit or colored to represent not being germane to or part of the object.

A "descriptor" refers to a mechanism to describe a position of a smooth boundary. Examples of a descriptor may include coordinates for a point that lies on a smooth boundary, an equation of a curve that falls on a smooth boundary, a position of a known element—such as a block—and an indicator of a position of the smooth boundary relative to the known element, and combinations thereof. Using at least one descriptor, a precise geometric representation of a smooth boundary can be computed.

A "characteristic" refers to an aspect of a blocky boundary of a blocky image that may reflect an appearance of a corresponding smooth boundary of a corresponding smooth image. A characteristic may be derived from a boundary shape defined by one or more blocks of the blocky image on a border of an object. An example of a characteristic is a boundary shape representation.

A "boundary shape representation" refers to a representation of a shape of a boundary of an object being converted from blocky to smooth. Examples of a boundary shape representation may include a polyline for an edge in a 2D scenario, a patch for a surface in a 3D scenario, and combinations thereof. In a 2D scenario with a polyline, the polyline may be realized as a set of coordinates of points along the polyline. A boundary shape representation may be determined in a neighborhood around a selected block, such as out to some number of blocks away from the selected block.

A "relationship expression" refers to a mechanism to describe how a blocky boundary relates to a corresponding smooth boundary. A characteristic of a blocky boundary may be associated with a relationship expression for machine learning purposes. An example of a relationship expression may include an indicator that relates a selected block along a blocky boundary to a geometry of a corresponding smooth boundary.

An "indicator" refers to an indication of a geometry of a smooth boundary relative to a blocky boundary, or a selected block thereof. Examples of an indicator may include a positional indicator, a directional indicator, and combinations thereof. A "positional indicator" refers to an indication of a position of a smooth boundary relative to a block of a blocky boundary. Examples of a positional indicator may include a distance, a scalar, and combinations thereof. A "directional indicator" refers to an indication of a direction or angle of a smooth boundary. A directional indicator may be provided relative to a descriptor of the smooth boundary. An example of a directional indicator may include a normal to the smooth boundary, such as a normal at the descriptor.

A "feature vector" refers to one or more features that may be applied to a machine learning system for training purposes or to generate an output. A characteristic of a blocky boundary may be encoded into a feature vector. An example of a feature vector in a 2D scenario is a set of coordinates for points defining a boundary shape representation.

A "machine learning system" refers to a module or an apparatus in a digital environment that is capable of producing an output based on an input using knowledge or intelligence garnered from training. In a supervised learning implementation, training samples are input to a machine learning system during training so that the machine can learn about at least one relationship that is incorporated into the training samples. After the training, the machine learning system can produce an output based on an input using the learned relationship. Examples of implementation techniques for machine learning systems for unsupervised or supervised learning may include association rule learning, support vector machines (SVMs), Bayesian networks, regression, artificial neural networks, and combinations thereof.

A "training set" refers to multiple instances of training items. A "training item" refers to a training sample that includes a first component that is associated with at least a second component. In example implementations, training items are generated by pixelizing or voxelizing 2D or 3D content that is defined in precise geometric representations to produce, respectively, a blocky pixel form or a blocky voxel form. Examples of a training item may include a characteristic of a blocky boundary of a blocky image in association with a relationship expression for the blocky boundary with respect to a corresponding smooth boundary, a boundary shape representation in association with an indicator of a geometrical property (e.g., position, curvature, angle) of a smooth boundary, a boundary shape representation in association with a positional indicator of a smooth boundary, a boundary shape representation in association with a directional indicator of a smooth boundary, a boundary shape representation in association with a positional indicator and a directional indicator, and combinations thereof.

A "geometric transformation" refers to a manipulation of an image or an object thereof. Examples of a geometric transformation may include a rotational transformation, a reflective transformation, a translation transformation, a dilation transformation, and combinations thereof. Performance of at least one geometric transformation can accommodate symmetry present in the geometric objects of both training sets and images being smoothed.

An "image scaling" refers to changing a displayable resolution of an image. Examples of image scaling may include image upscaling and image downscaling. "Image upscaling" refers to increasing a resolution of an image (e.g., scaling from 1920×1080 to 3840×2160) and thereby increasing a relative smoothness and decreasing a relative blockiness of the image. "Image downscaling" refers to decreasing a resolution of an image (e.g., scaling from 3840×2160 to 1920×1080) and thereby decreasing a relative smoothness and increasing a relative blockiness of the image. A shape that is stored in a precise geometric representation can be scaled appropriately to any given resolution.

Also, unless context dictates otherwise, use herein of the word "or" may be considered use of an "inclusive or," or a term that permits inclusion or application of one or more items that are linked by the word "or" (e.g., a phrase "A or B" may be interpreted as permitting or being relevant to just "A," to just "B," or to both "A" and "B").

Example Environment

FIG. 1 illustrates an environment 100 for example embodiments that are operable to employ techniques described herein that relate to smoothing images using machine learning. As illustrated, the example environment 100 includes at least one computing device 102, at least one display 108, and at least one user 110. The computing device 102 includes at least one image smoothing module 104 and at least one machine learning system 106. The computing device 102 is coupled to the display 108 wirelessly or by wire. The display 108 may be separate from or integrated with the computing device 102. The computing device 102 can present one or more images on the display 108.

The computing device 102 is capable of performing a smoothing operation 112 to de-blockify an image. In a before smoothing phase 114, the computing device 102 displays blocky images 118. In an after smoothing phase 116, the computing device 102 displays corresponding smooth images 120. The top blocky image 118 corresponds to the top smooth image 120, both of which represent a right triangle. The bottom blocky image 118 corresponds to the bottom smooth image 120, both of which represent an oval or ellipse. Although shown in a 2D scenario, the principles described herein are also applicable to 3D scenarios.

In one or more embodiments, the image smoothing module 104 analyzes a blocky image 118 to determine a characteristic 122 of the blocky image 118. For example, a boundary shape representation in the neighborhood of a selected block of the blocky image 118 may be determined. The image smoothing module 104 applies the characteristic 122 to the machine learning system 106. In response to the characteristic 122, the machine learning system 106 returns a relationship expression 124. The relationship expression 124 expresses a relationship between the selected block of a blocky boundary of the blocky image 118 and a corresponding smooth boundary of the corresponding smooth image 120. For example, the relationship expression 124 may indicate a distance between the selected block and the corresponding smooth boundary. After obtaining multiple relationship expressions 124, the image smoothing module 104 constructs the corresponding smooth boundary. By constructing multiple smooth boundaries, the smooth image 120 corresponding to the blocky image 118 is constructed.

The image smoothing module 104 or the machine learning system 106 may be located at or executing on the computing device 102. The image smoothing module 104 or the machine learning system 106 individually or jointly represent functionality to implement processes for smoothing images using machine learning as described herein. Hence, the image smoothing module 104 or the machine learning system 106 may at least partially implement one or more techniques or systems as described herein for image smoothing with a machine learning system. The user 110 or a developer (not shown) may implement the image smoothing module 104 or the machine learning system 106 as a software package that executes on and specially configures one or more processors; as a hardware apparatus; or using a combination of software, hardware, firmware, or fixed logic circuitry; and so forth.

A computing device 102 may be implemented or realized as any suitable type of computing device, including an end-user device, a server device, a distributed computing device, and so forth. Examples of an end-user device include a desktop computer, a laptop computer, a mobile device (e.g., assuming a handheld configuration such as a tablet, a mobile phone, or a phablet), a mobile device coupled to a separate screen, an entertainment appliance such as a smart television, a game console, a device that is capable of receiving gesture input, a device that is capable of receiving speech or video input, a device that is capable of providing 2D or 3D image output, a device that is capable of providing sound output, a wearable computing device such as a smart watch or intelligent glasses, a virtual reality (VR) device such as a headset, or some combination thereof. Thus, an end-user device may range from a relatively high-resource device with substantial memory and processor resources (e.g., personal computers or game consoles) to a relatively low-resource device with constrained memory or processing resources (e.g., mobile devices such as wearables). Examples of a server device include a web server, a server running open source software, a server of a proprietary design, a stand-alone server, a server blade, an allocated portion of a server farm, server functionality distributed across at least one data center, or some combination thereof. A server device may be representative of a plurality of different machines or distributed computing resources that interoperate or coordinate to perform operations "over the cloud" or "in the cloud" as is known.

As shown, the image smoothing module 104 and the machine learning system 106 are located at or executing on the same computing device 102. Alternatively, the image smoothing module 104 or the machine learning system 106 may be executing on different computing devices. If so, the image smoothing module 104 and the machine learning system 106 may be in communication with each other via at least one network (not shown in FIG. 1). Such a network may be implemented with at least a portion of one or more network types. Examples of network types include a public network, a private network, the internet, the WWW, an Ethernet, an intranet, an extranet, a wireless network, a wired network, a cellular network, an infrastructure network, an ad hoc network, a Bluetooth network, a Wi-Fi network, an LTE network, a PSTN, or some combination thereof. Furthermore, the image smoothing module 104 or the machine learning system 106 may be individually distributed across or at least partially executing over multiple devices, such as an end-user device implemented as a gaming machine and a server device that provides cloud computing resources. An example in which the image smoothing module 104 and the machine learning system 106 are not co-located is described herein with reference to FIG. 16.

Having considered an example environment, consider now a discussion of some example details of systems and techniques for smoothing images using machine learning in accordance with one or more embodiments.

Systems and Techniques

Figure 2:
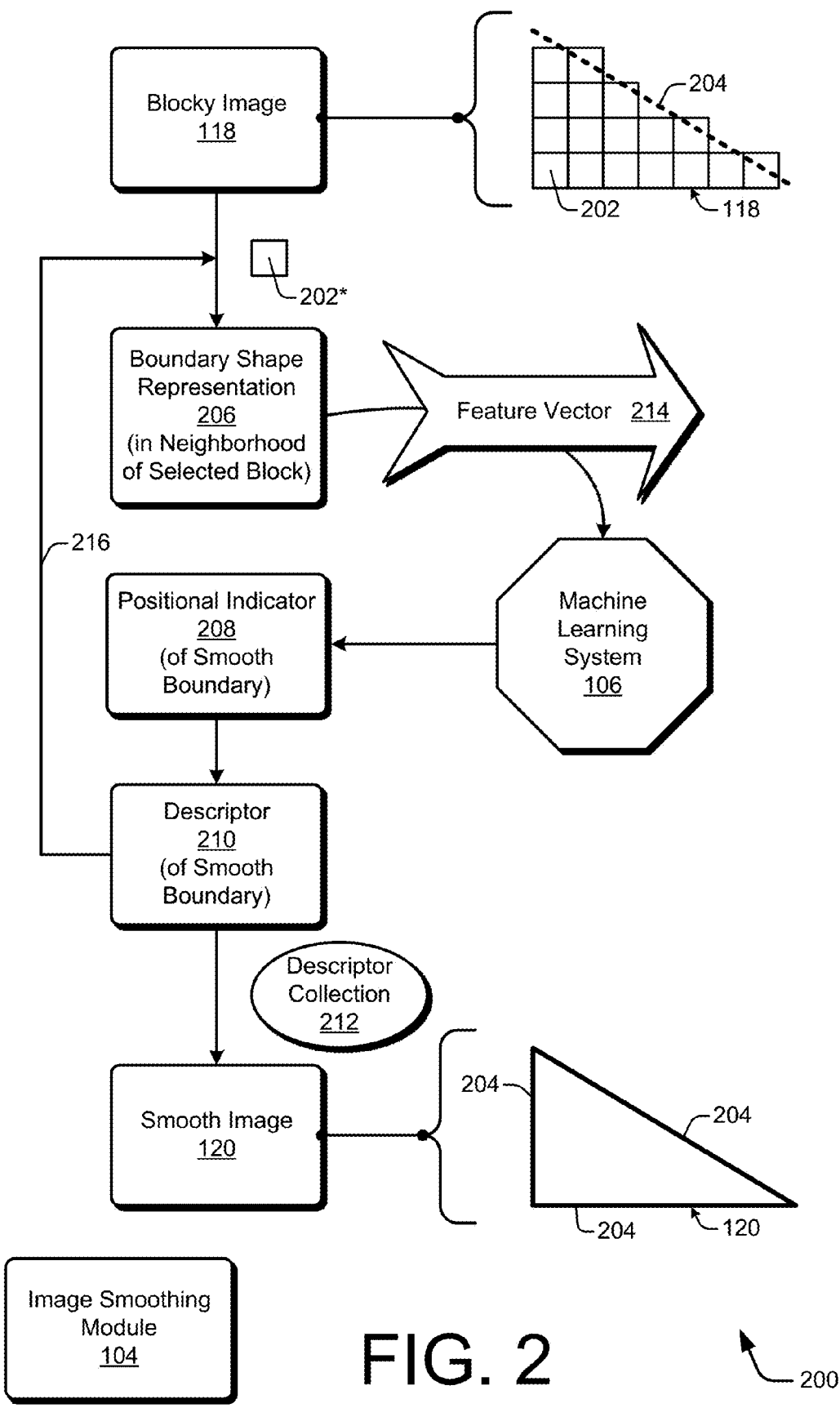
FIG. 2 illustrates an example approach to producing a smooth image from a blocky image using a machine learning system.
Figure 8:
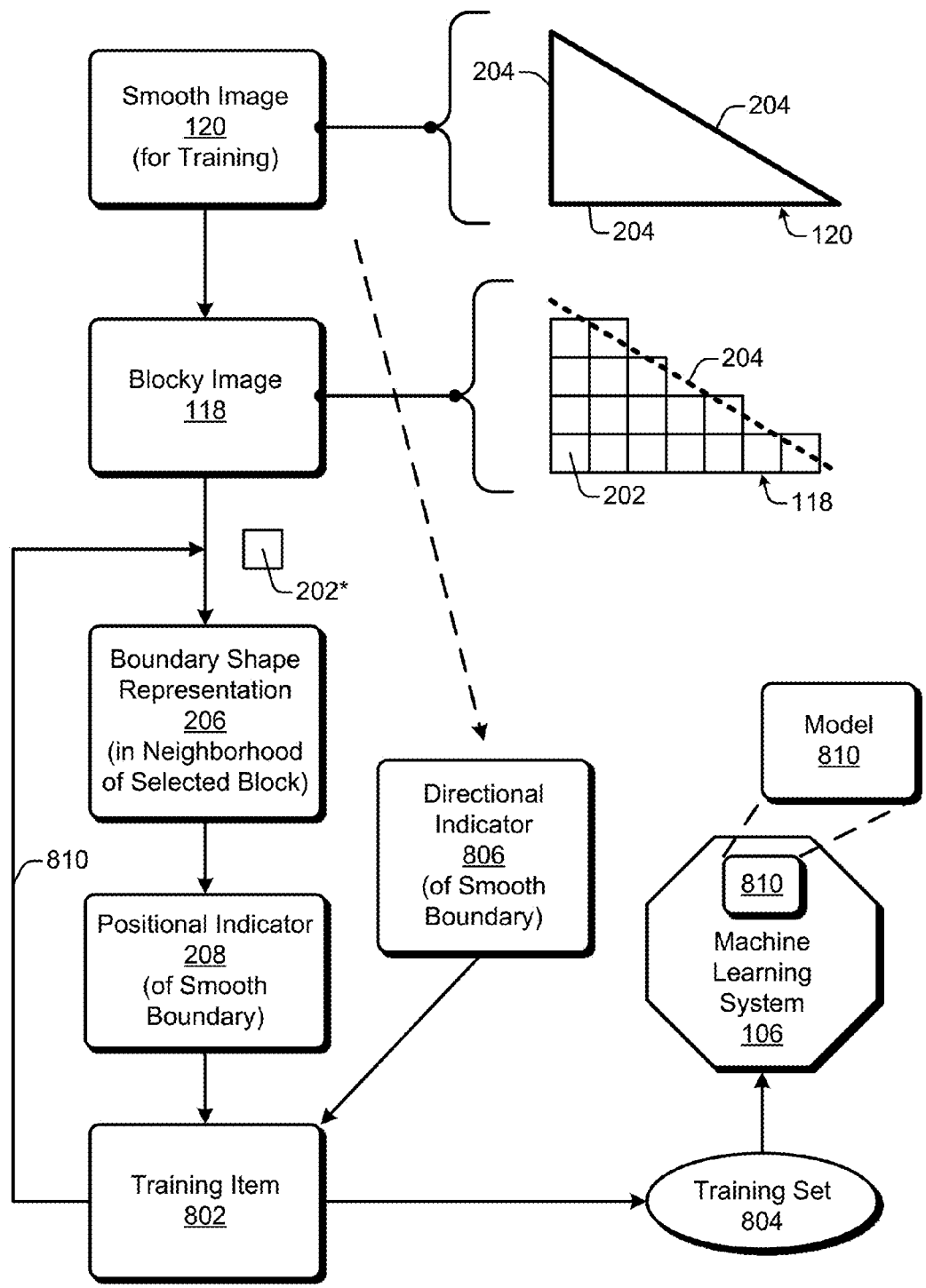
FIG. 8 illustrates an example approach to building a machine learning system starting with smooth images.
Figure 9:
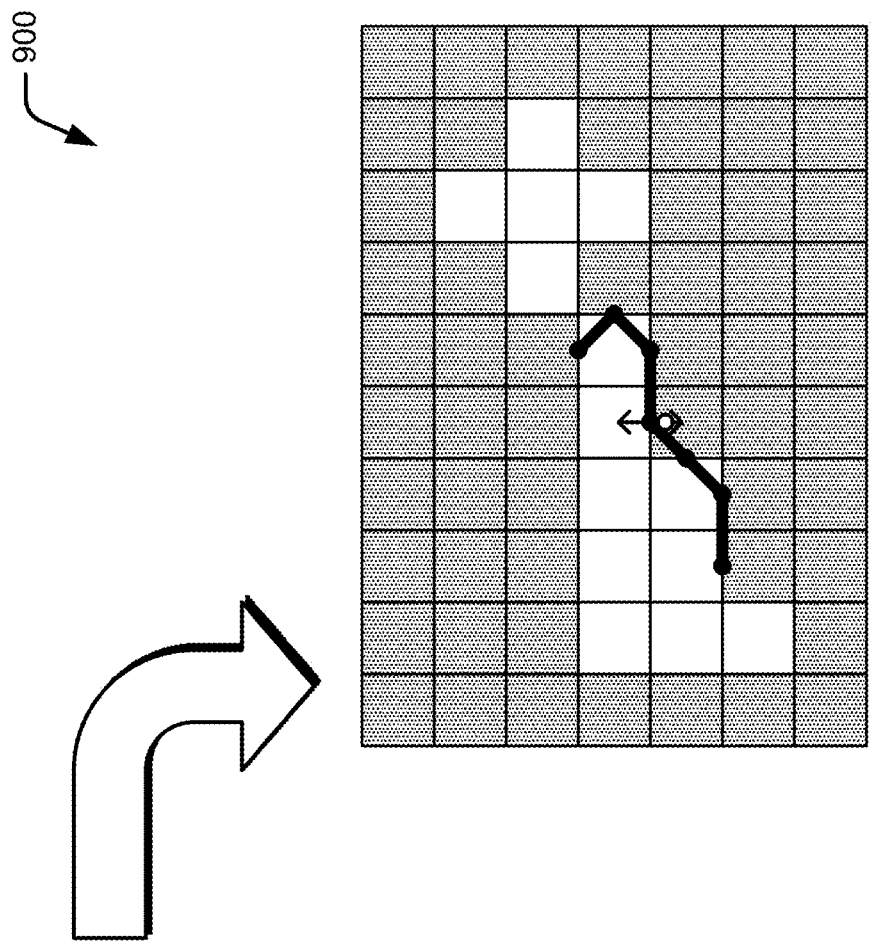
FIG. 9 illustrates an example of rotational symmetry, which is an example of image transformational symmetry that may be utilized in one or more embodiments.
Figure 10:
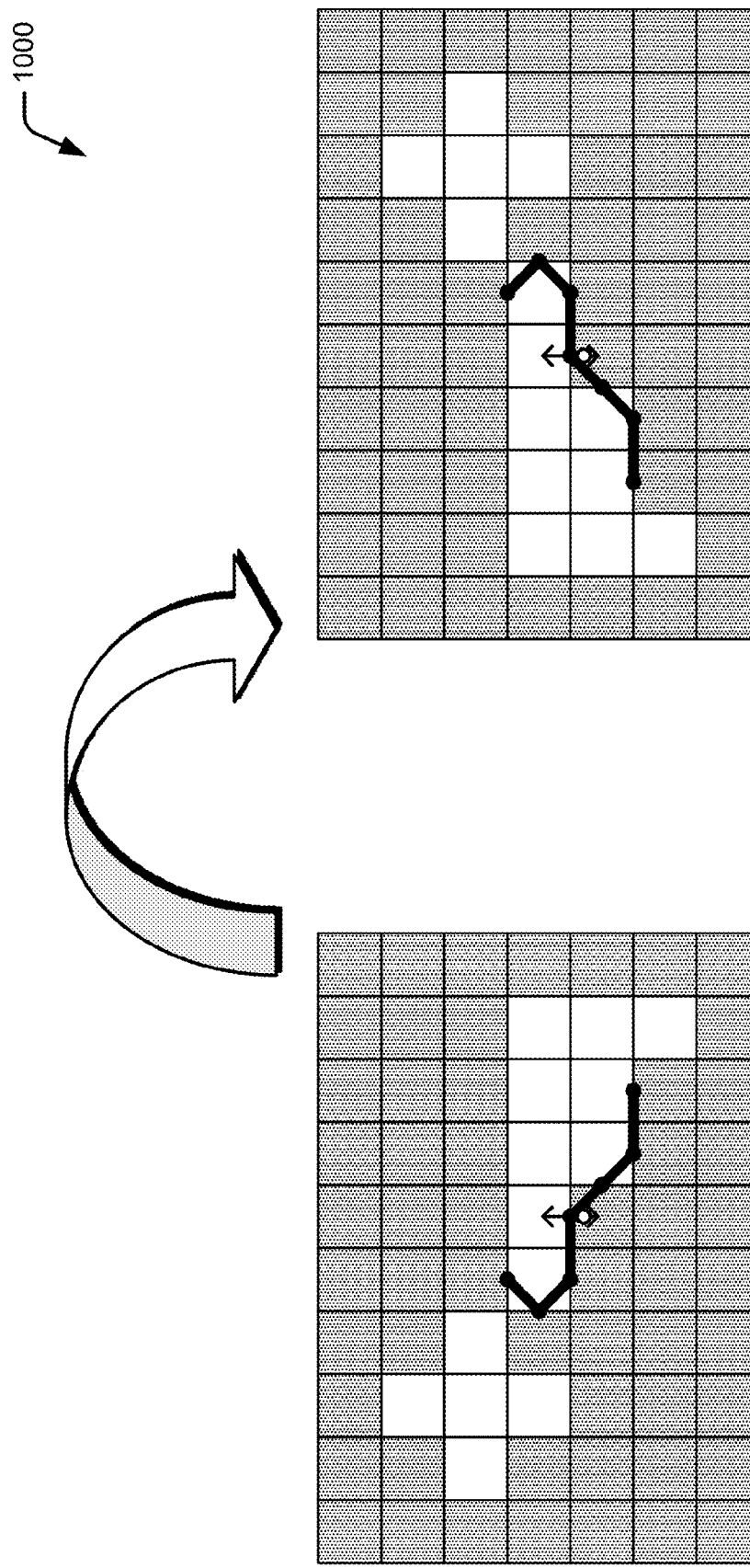
FIG. 10 illustrates an example of reflective symmetry, which is another example of image transformational symmetry that may be utilized in one or more embodiments.
Figure 11:
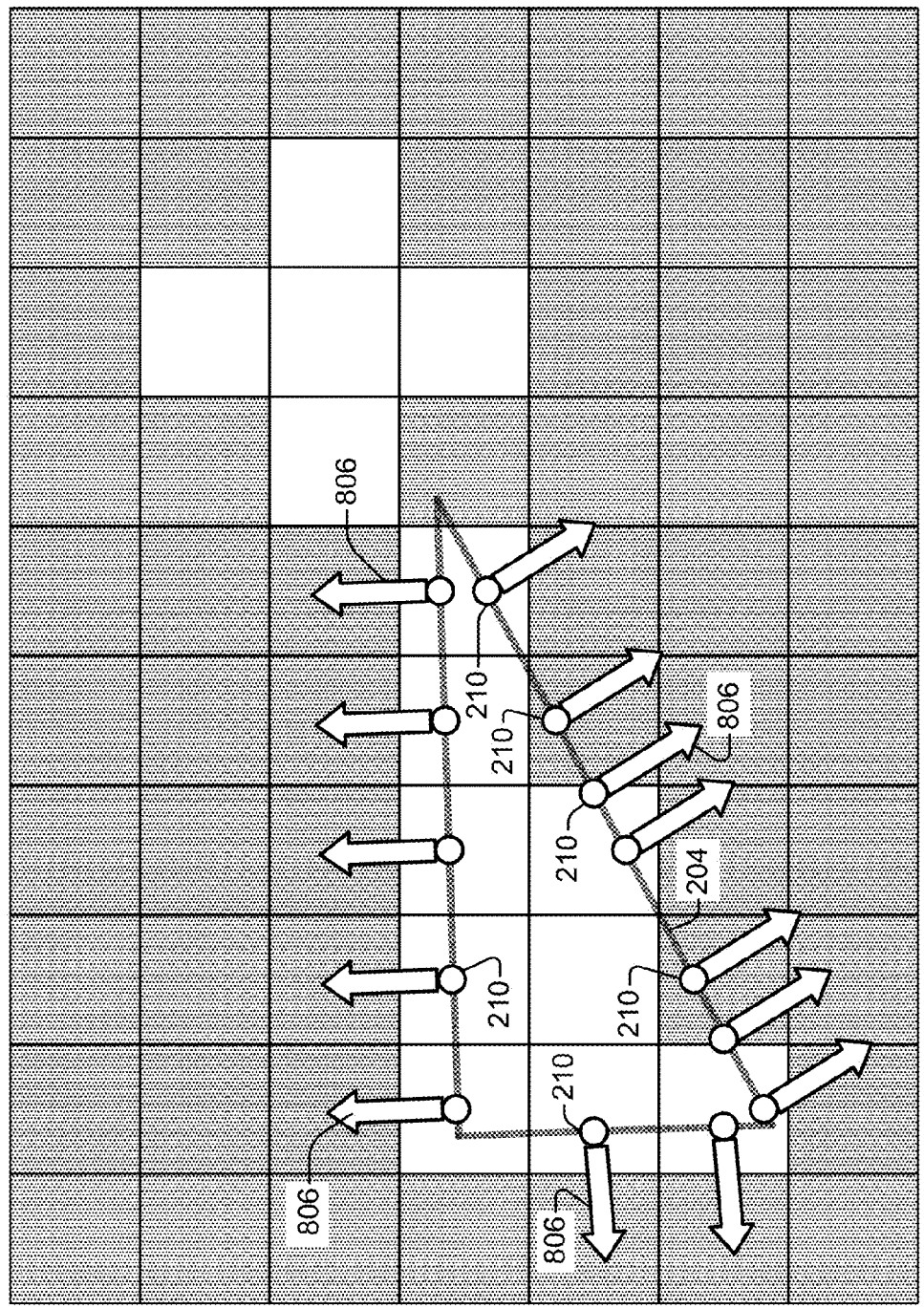
FIG. 11 depicts examples of directional indicators in relation to descriptors of smooth boundaries of a smooth image.

This section describes some example details of systems and techniques for smoothing images using machine learning in accordance with one or more embodiments. FIG. 2 illustrates at a relatively high level an example approach to de-blockifying a blocky image to produce a smooth image using a machine learning system. FIGS. 3-7 depict at a relatively low level different aspects of the example approach for de-blockifying a blocky image. FIG. 8 illustrates at a relatively high level an example approach for producing a machine learning system that is usable with image smoothing. FIGS. 9 and 10 show how geometrical symmetry can be accommodated as part of the described image smoothing paradigm. And FIG. 11 depicts an example approach for fine tuning construction of smooth boundaries of a smooth image that correspond to blocky boundaries of a blocky image.

Figure 3:
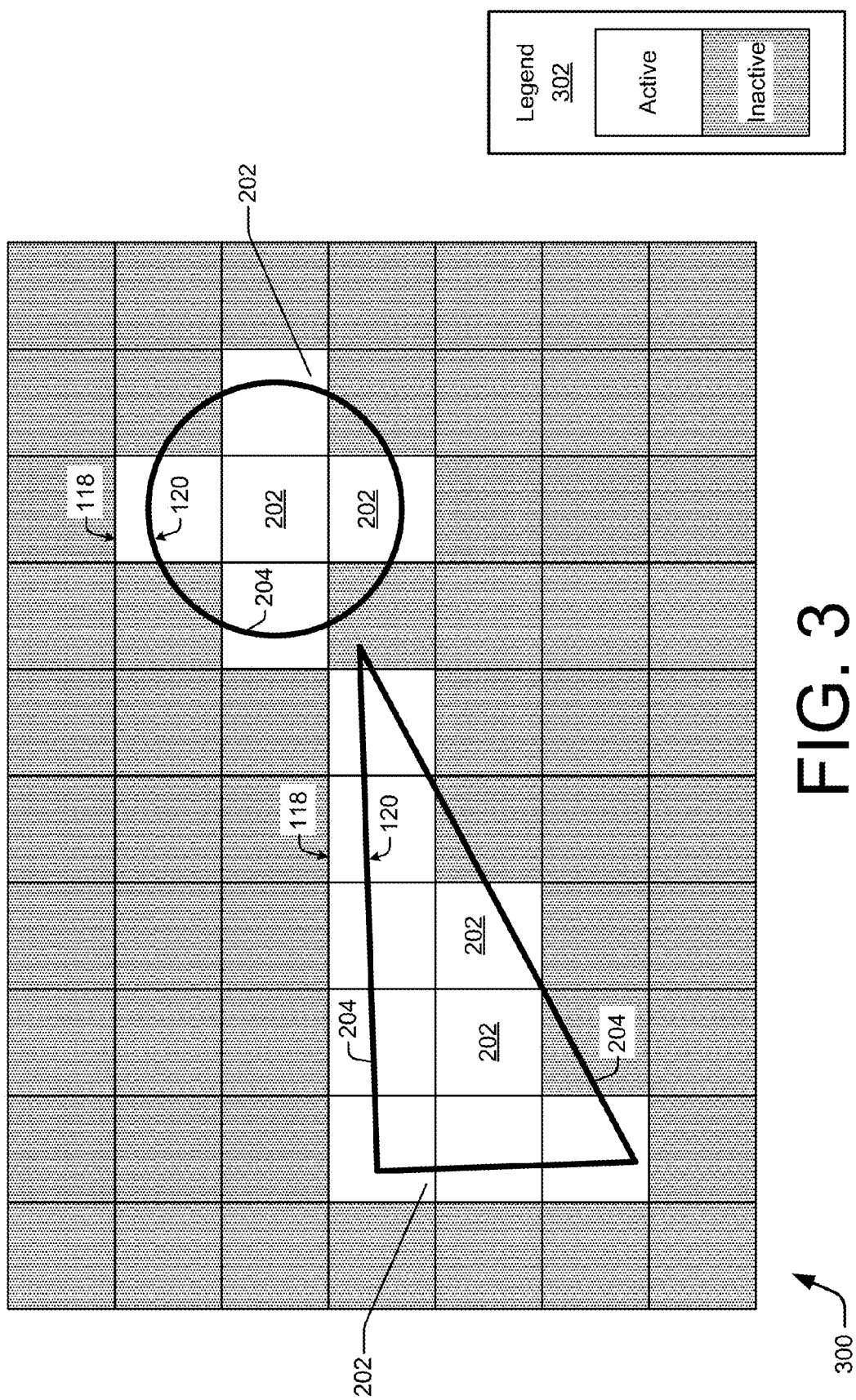
FIG. 3 depicts an example of a blocky image including multiple blocks and a corresponding smooth image including smooth boundaries.

FIG. 2 illustrates an example approach 200 to producing a smooth image 120 from a blocky image 118 using a machine learning system 106. The image smoothing module 104 may implement the approach 200. In one or more embodiments, the blocky image 118 includes multiple blocks 202. In order to convert the blocky image 118 to the smooth image 120, at least one smooth boundary 204 is to be constructed. For reference, a smooth boundary 204 is shown as a dashed line in relation to multiple blocks 202 of the blocky image 118. Additional examples of blocks 202 and smooth boundaries 204 are depicted in FIG. 3.

Initially, a block 202* of the multiple blocks 202 of the blocky image 118 is selected for consideration. The image smoothing module 104 determines a boundary shape representation 206 in a neighborhood around the selected block 202*. Example approaches to determining a boundary shape representation are described herein with reference to FIG. 7. The boundary shape representation 206 is encoded as a feature vector 214 that captures the geometry of the boundary shape representation 206. The image smoothing module 104 applies the feature vector 214 to the machine learning system 106 to obtain a positional indicator 208. The machine learning system 106 provides the positional indicator 208 of the smooth boundary 204. The positional indicator 208 can be expressed, for example, as a distance that is relative to a position of the selected block 202*.

The image smoothing module 104 uses the positional indicator 208 to determine a descriptor 210 of the smooth boundary 204. The descriptor 210 may be implemented as at least one coordinate point along the smooth boundary 204. Alternatively, the descriptor 210 may be implemented as a position of the selected block 202* in conjunction with a distance to the smooth boundary 204. To determine another descriptor 210, the image smoothing module 104 selects and processes another block 202* as indicated by an arrow 216. Multiple descriptors 210 may be determined to create a descriptor collection 212. The image smoothing module 104 uses the descriptor collection 212 to construct at least one smooth boundary 204. To construct the smooth image 120, the image smoothing module 104 constructs multiple smooth boundaries 204 based on one or more descriptor collections 212. The smooth image 120, or the smooth boundaries 204 thereof, may be defined in a precise geometric representation after the construction.

In an example environment described above, participants of modeling games produce 3D models made from voxels. In this environment, a local neighborhood around each voxel is examined. More specifically, given a location v_i in a voxel model, the labeling of voxels (e.g., as active or inactive) in a neighborhood around the voxel v_i produces a stencil pattern of active versus inactive voxels on either side of a boundary of an object in an image. The stencil pattern provides contextual information on what the corresponding smooth boundary (e.g., smooth surface in a 3D scenario) was intended to look like by the participant creator. This boundary shape or stencil pattern is discussed below with reference to FIGS. 3-7.

FIG. 3 depicts at 300 generally examples of a blocky image 118 including multiple blocks 202 and a respective corresponding smooth image 120 including one or more smooth boundaries 204. As illustrated, the multiple blocks 202 correspond to pixels in a 2D environment and are positioned over a 2D pixel grid. As indicated by a legend 302, lighter pixels are active or germane to an object of the image, and darker pixels are inactive or non-germane to the object of the image.

On the left, nine blocks 202 form a blocky image 118 of a right triangle, and three (straight) smooth boundaries 204 form a corresponding smooth image 120 of the right triangle. On the right, five blocks 202 form a blocky image 118 of a circle, and one (curved) smooth boundary 204 forms a corresponding smooth image 120 of the circle. From an inverse perspective, the pixel blocks 202 of the blocky images 118 may be created from the smooth images 120 via rasterization, such as to generate training samples to train a machine learning system. The smooth images 120, or the smooth boundaries 204 thereof, may be defined in a precise geometric representation after construction for smoothing purposes or before rasterization for training purposes.

Certain principles of smoothing images using machine learning are described with reference to the blocky image 118 and the corresponding smooth image 120 of the right triangle having three straight smooth boundaries 204. However, the principles are also applicable to smooth images having at least one curved smooth boundary. Furthermore, principles are described with reference to the 2D pixel implementation of the multiple blocks 202 for a de-pixelization scenario. Nevertheless, the principles are applicable and extensible to 3D voxel implementations for de-voxelization scenarios, which extension is described herein below.

Figure 4:
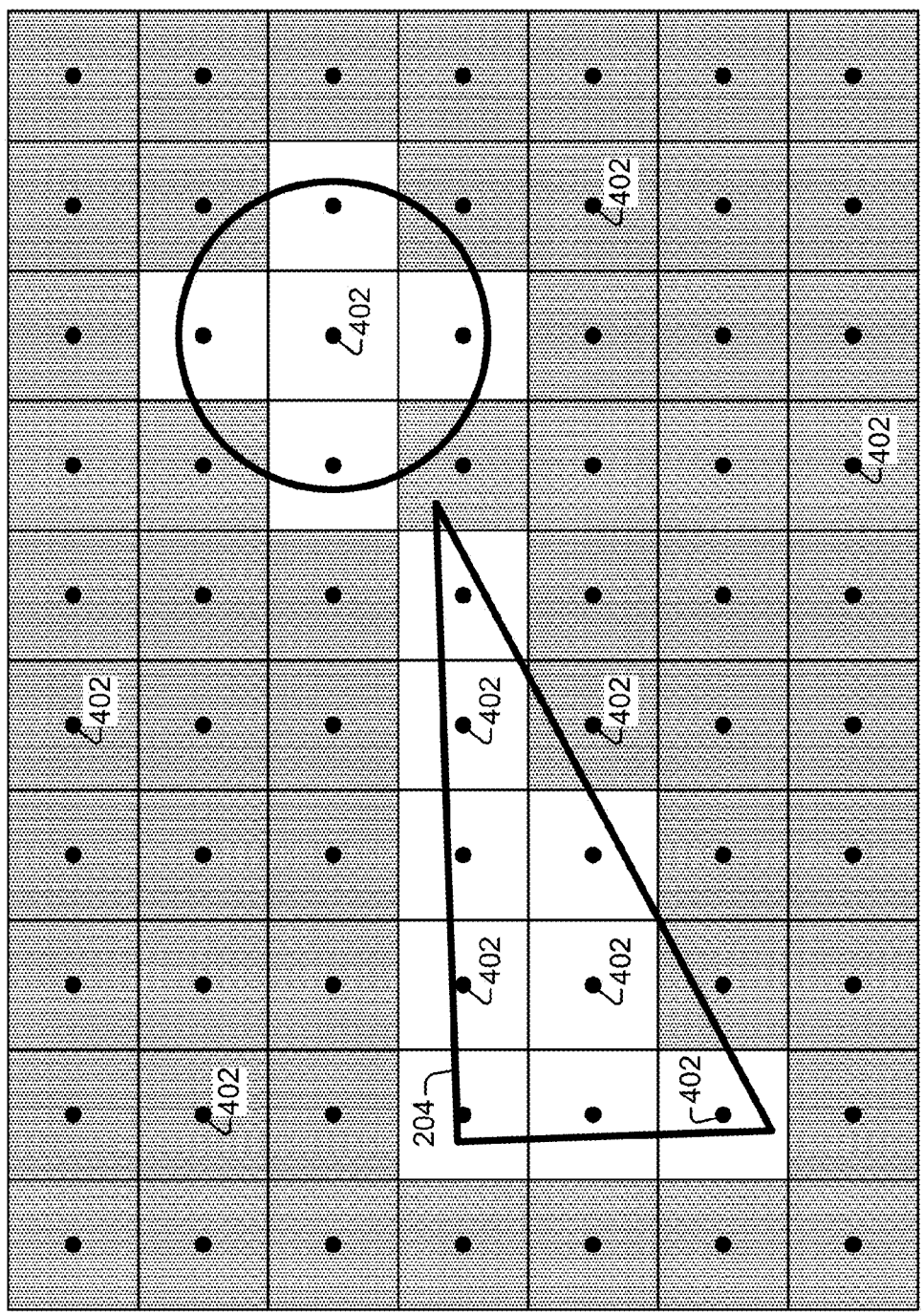
FIG. 4 depicts blocky and smooth images in the context of illustrating example centers of the blocks.

FIG. 4 depicts at 400 generally both blocky images and smooth images in the context of illustrating example centers 402 of the blocks. In one or more embodiments, pixel blocks that are labeled or set to "active" are by definition those pixel blocks whose center 402 is located within the smooth boundary of the object of the image.

Figure 5:
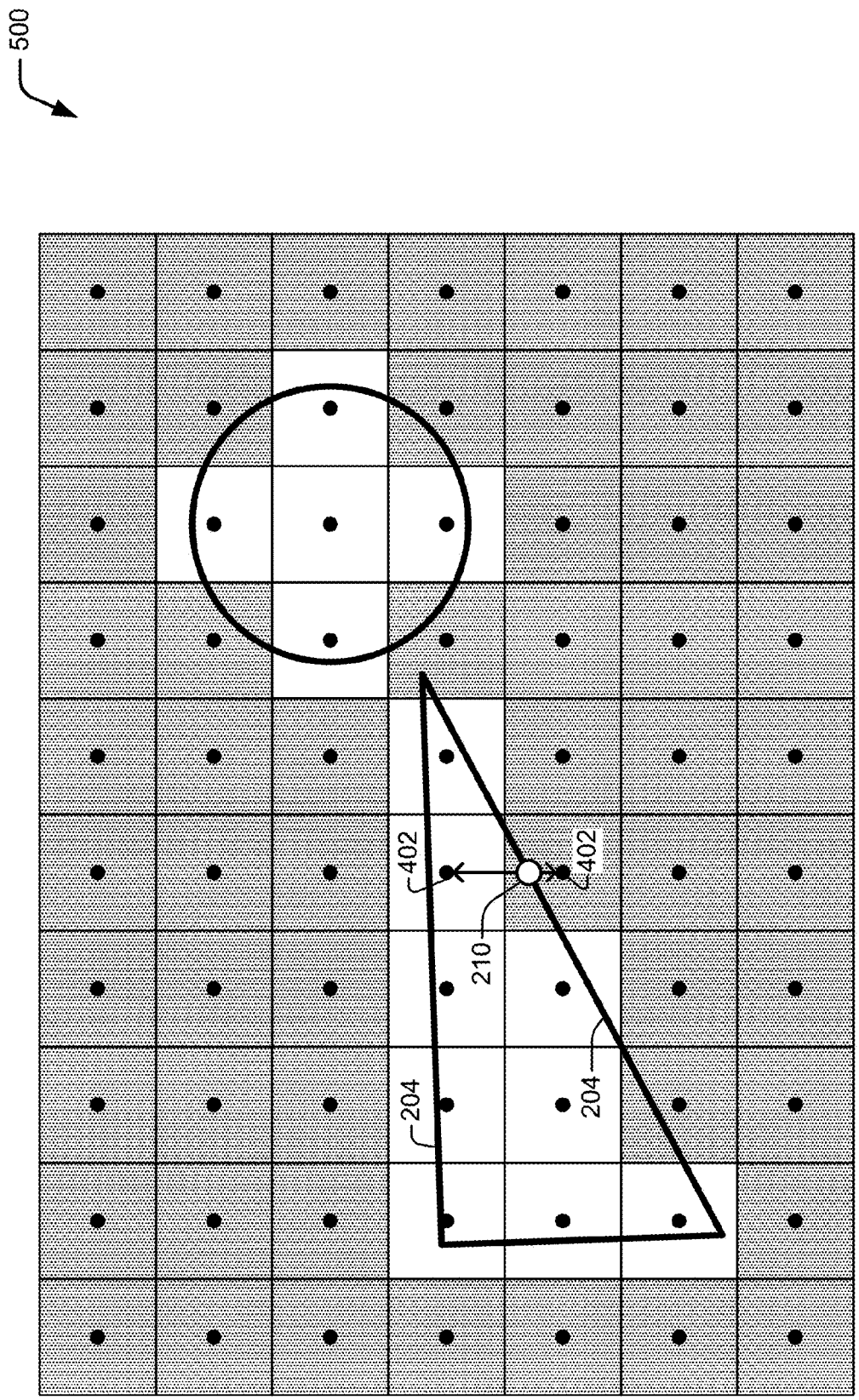
FIG. 5 depicts an example descriptor of a smooth boundary in relation to centers of two adjacent blocks.

FIG. 5 depicts at 500 generally an example descriptor 210 of a smooth boundary 204 in relation to centers 402 of two adjacent blocks. As illustrated, the descriptor 210 lies along the lower smooth boundary 204. For each blocky boundary between active/inactive pixel blocks for the blocky image, a goal is to learn a function that indicates a location of where the true or smooth boundary for the smooth image crosses between the two centers 402 of the two adjacent pixel blocks. Mathematically, this function can be thought of as: F(blocky boundary)→Crossing Location Indicator. An example scheme for implementing this function F( ) is described below with reference to FIG. 6.

Figure 6:
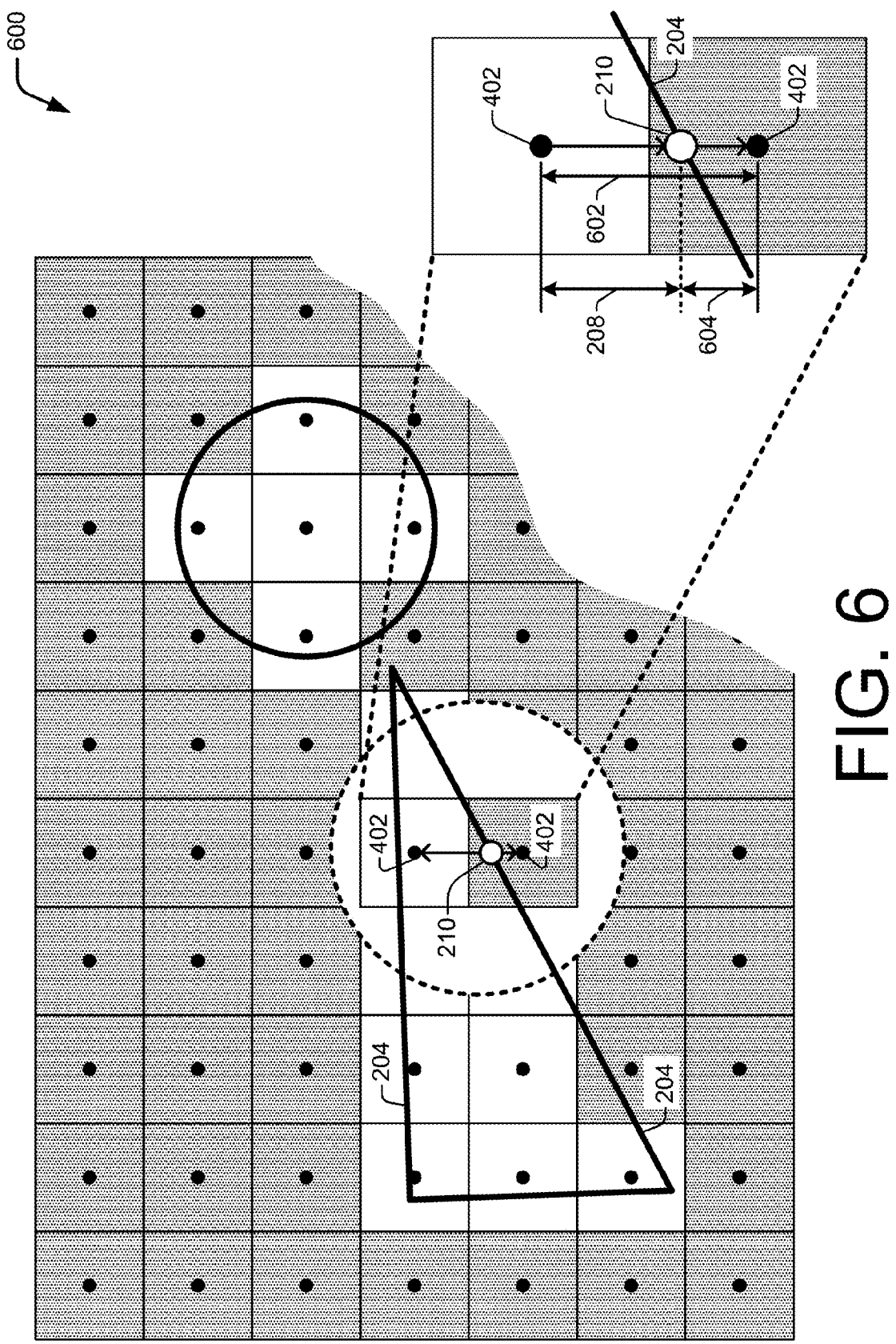
FIG. 6 depicts an example positional indicator in relation to centers of two adjacent blocks.

FIG. 6 depicts at 600 generally an example positional indicator 208 in relation to two centers 402 of two adjacent blocks. To discuss relative distances with respect to two adjacent centers 402, an enlarged view of the two adjacent blocks near the descriptor 210 is shown to the right. An inter-center distance 602 between two adjacent centers 402 is indicated. An example of a positional indicator 208 for the smooth boundary 204 is identified between the upper center 402 of the active block and the descriptor 210 of the smooth boundary 204. A remainder distance 604 between the descriptor 210 and the lower center 402 is also shown. A difference between the inter-center distance 602 and the positional indicator 208 results in the remainder distance 604.

Generally, a line between adjacent pixel blocks of which one is active and one is inactive represents a blocky boundary (e.g., a boundary edge in a 2D scenario). The descriptor 210 (i.e., the small white circle) represents the location of the true intersection (e.g., for a precise geometric representation) between active and inactive portions of the image. The location of this intersection can be indicated by the positional indicator 208. In an example implementation, the positional indicator 208 is encoded with a single scalar value that is in the range [0,1). If the scalar value is zero, then the smooth boundary 204 passes through the upper center 402 (e.g., of the active pixel block) that is interior to the object of the image (e.g., the upper center 402 that is above the descriptor 210 in FIG. 6). If the scalar value is close to one, then the true intersection is close to the lower center 402 (e.g., of the inactive pixel block) that is exterior to the object of the image (e.g., the lower center 402 that is below the descriptor 210 in FIG. 6). Using this scheme for the function F(Blocky Boundary), the function F( ) may return a single scalar value.

Figure 7:
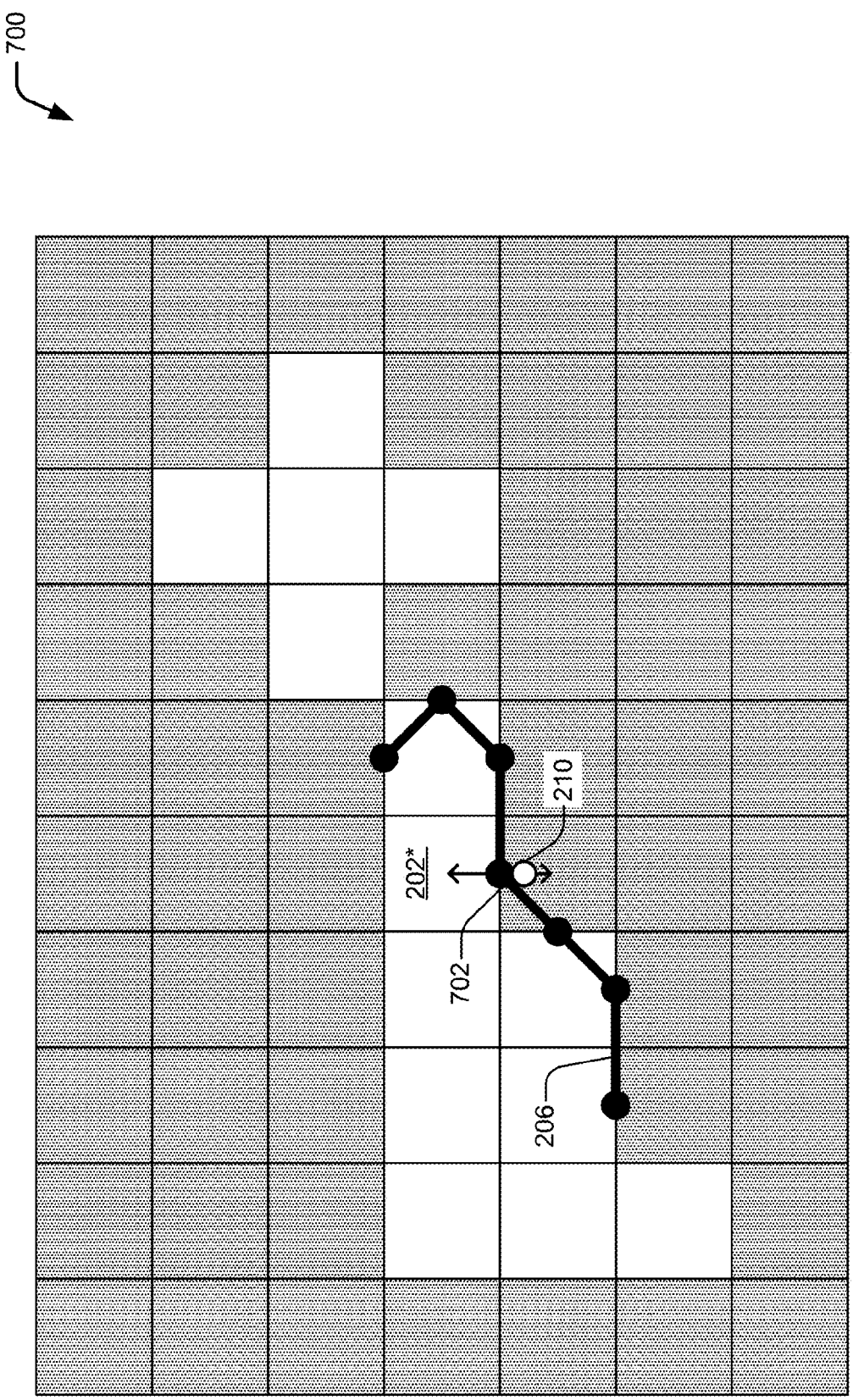
FIG. 7 depicts an example boundary shape representation in a neighborhood around a selected block.

FIG. 7 depicts at 700 generally an example boundary shape representation 206 in a neighborhood around a selected block 202*. For the input to the function F(Blocky Boundary), the "shape" of the blocky boundary around the selected block 202* is encoded. An example of the boundary shape representation 206 is shown in the neighborhood around the selected block 202*. In one or more embodiments, for boundary shape purposes around the selected block 202*, an origin point 702 is designated, such as in the middle of the interface between the selected block 202* and the adjacent inactive block. The designated origin point 702 is considered to be located at the origin of a local coordinate system. The image smoothing module 104 can encode the boundary shape representation 206 around this origin point 702 as a sequence of 2D coordinate points. Alternatively, the boundary shape representation 206 may be encoded as vector offsets from the origin point 702.

In the illustrated example, the boundary shape representation 206 can be encoded with the following list of coordinate points: [−2.0,−1.0], [−1.0,−1.0], [−0.5,−0.5], [0,0], [1,0], [1.5,0.5], [1.0,1.0]. The coordinate points are located in the middle of interfaces between respective active blocks of the blocky image and respective adjacent inactive blocks at any of the one, two, or three exposed interfaces of the active blocks. This sequence of coordinate points may serve as the feature vector 214 (e.g., of FIG. 2) that is input to the function F(Blocky Boundary). This feature vector can be simplified because the middle point by definition is the origin and thus the same for each feature vector. Dropping the [0,0] coordinate point in the middle of the feature vector yields a smaller size for each feature vector and for one or more data bases of a machine learning system.

FIG. 8 illustrates an example approach 800 to building a machine learning system 106 starting with smooth images 120. In order to use the machine learning system 106 to convert blocky images 118 to smooth images 120, the machine learning system 106 is first trained to produce a model 810. In one or more embodiments, a machine learning training module 808 performs the training as described below. The machine learning training module 808 may be part of, integrated with, separate from, etc. the image smoothing module 104 (e.g., of FIGS. 1 and 2). Generally, the machine learning system 106 is trained to infer a likely smooth boundary for a smooth image from a blocky boundary context around a block of a blocky image. This training is performed by starting with smooth images 120 that are selected for training and creating a training set 804 from corresponding blocky images 118 that are converted from the smooth training images.

As shown, a smooth image 120 is acquired for training purposes. The smooth image 120 includes multiple smooth boundaries 204. The acquired smooth image 120, or the smooth boundaries 204 thereof, may be defined in a precise geometric representation, such as in a vector form. The machine learning training module 808 downscales or rasterizes the smooth image 120 to blockify the smooth image 120 so as to produce a blocky image 118 at a desired resolution. In a 2D scenario, the machine learning training module 808 pixelates the smooth image 120 so as to produce a blocky image 118 having a blocky pixel form. In a 3D scenario, the machine learning training module 808 voxelates the smooth image 120 so as to produce a blocky image 118 having a blocky voxel form. The blocky image 118 includes multiple blocks 202. For perspective, a smooth boundary 204 is overlaid on the blocky image 118 as a dashed line.

A block 202* of the multiple blocks 202 of the blocky image 118 is selected for consideration. The machine learning training module 808 determines a boundary shape representation 206 of the blocky image 118 in a neighborhood around the selected block 202*. The approach described above with reference to FIG. 7 may be used to determine the boundary shape representation 206. The machine learning training module 808 also determines a positional indicator 208 of the smooth boundary 204. Because the smooth image 120 is known, the positional indicator 208 for the smooth boundary 204 with regard to the selected block 202* may be determined using the principles described above with reference to FIG. 6.

The machine learning training module 808 generates a training item 802 using the boundary shape representation 206 and the positional indicator 208. For example, an encoded version of the boundary shape representation 206 is associated with the positional indicator 208. The boundary shape representation 206 serves as a characteristic of the blocky image 118, and the positional indicator 208 serves as an expression of a relationship between the blocky image 118 and the smooth image 120. A training item 802 may further include a directional indicator 806. The directional indicator 806 is an indication of a direction (e.g., an angle, a slope, a curvature, or a derivative) of a smooth boundary 204 in a region proximate to the selected block 202*, such as at a descriptor 210 (e.g., of FIGS. 5-7). An example of a positional indicator 208 is a normal to the smooth boundary 204. Directional indicators 806 are described further herein with reference to FIG. 11. The machine learning training module 808 may further associate the directional indicator 806 with the boundary shape representation 206 as part of the training item 802.

To generate additional training items 802, the machine learning training module 808 selects another block 202* from the multiple blocks 202 of the blocky image 118 as indicated by an arrow 810, and the process is repeated. Multiple training items 802 may be bundled into a training set 804. The machine learning training module 808 applies the training set 804 to the machine learning system 106 to train the machine learning system 106 to produce a model 810. With the model 810, the machine learning system 106 is capable of modeling at least one relationship (e.g., which may be indicated by a positional indicator 208 or a directional indicator 806) between the boundary shape representations 206 of blocky images 118 and locations of corresponding smooth boundaries 204 of smooth images 120. Additional training items 802 may be generated by using additional smooth images 120. Furthermore, a given smooth image 120 may be leveraged to generate still more training items 802 by adjusting the image. First, the given smooth image 120 may be rotated different numbers of degrees before different boundary shape representations 206 are determined. Second, the given smooth image 120 may be shifted by different amounts that are smaller than a block size to determine different boundary shape representations 206.

Using the nomenclature introduced above, the function that the machine learning system 106 is being trained to predict is: F(Blocky Boundary)→Crossing Location Indicator. A machine learning training process, including but not limited to a standard regression technique, may be applied to learn this mapping. In a 2D environment, many artist-designed collections of shapes are available that have precise geometric representations. Examples include fonts and black and white icons. Random rotations and sub-pixel shifts of the shapes may be utilized to further multiply the number of available training sample pairs: <Blocky_Boundary_i, Crossing_Location_Indicator_i>.

Given a training set of these training sample pairs, a number of different techniques may be employed to compute F( ). An example technique is a nearest neighbor strategy. Given an input Blocky_Boundary_j, a database of training samples may be searched to ascertain a closest match, which returns a scalar value result. This technique can be extended to find the k closest matches and then blending resulting values to ascertain a final scalar value result. A nearest-neighbor reconstruction, for example, entails specification of some distance function between boundaries, e.g. d(Blocky_Boundary_i, Blocky_Boundary_j), which returns zero if both Blocky_Boundary_i and Blocky_Boundary_j are the same. Another, more advanced, technique is to use a deep neural network. However, one or more other techniques may additionally or alternatively be employed to implement the machine learning system 106, including but not limited to those that are identified herein above in the "Terminology Examples" section.

FIGS. 9 and 10 illustrate how geometrical symmetry can be accommodated in example implementations of image smoothing using a machine learning system. Generally, transformations manipulate a geometrical object. By way of example only, rotations and reflections are discussed below. Geometrical symmetry can be accommodated to reduce a size of the training space and to enhance the visual symmetry of the output. The pixel grid, the boundary shape representation 206, and the origin point 702 of FIG. 7 are illustrated in FIGS. 9 and 10 and discussed below to describe the symmetrical geometrical aspects. However, the reference numbers are omitted for the sake of clarity.

FIG. 9 illustrates at 900 generally an example of rotational symmetry. The image smoothing module 104 (of FIGS. 1 and 2) or the machine learning training module 808 (of FIG. 8) can take advantage of 90 degree rotational symmetry that is induced by the pixel grid. Assume, for instance, that a blocky boundary is to be encoded, but the edge of the boundary is not horizontal and facing downward. An example is shown on the left of FIG. 9. To accommodate the geometrical symmetry, the pixel grid is rotated in 90 degree increments (e.g., 90, 180, 270, or −90) until the edge is horizontal and facing downward, as shown on the right. For FIG. 9, the pixel grid is rotated one 90 degree increment clockwise as is apparent from the example boundary shape representation (i.e., the thick polyline). This causes the active pixel to be on top and the inactive pixel to be on the bottom, with the boundary shape representation located at least partially between the active pixel and the inactive pixel. The image smoothing module 104 or the machine learning training module 808 can then encode the blocky boundary.

FIG. 10 illustrates at 1000 generally an example of reflective symmetry. With reference to the left side of FIG. 10, the example boundary shape representation (i.e., the thick polyline) is shown in a different orientation. If the image is flipped horizontally, the results have the same values. The image smoothing module 104 or the machine learning training module 808 can therefore take advantage of this type of symmetry by flipping the order of the encoded boundary. To do this, the coordinate locations of the boundary shape representation that are one unit away from the origin point are inspected. If the ordinate or "y" value of the coordinate point to the left of the origin point is greater than that of the coordinate point to the right of the origin point, the image is flipped horizontally. On the other hand, if the ordinate or "y" value of the coordinate point to the left of the origin point is less than that of the coordinate point to the right of the origin point, the image is not flipped. If the "y" values are the same at one unit away from the origin point, the image smoothing module 104 or the machine learning training module 808 inspects the coordinate points along the boundary shape representation that are two units away from the origin point and repeats the comparison process.

FIG. 11 depicts at 1100 generally multiple examples of directional indicators 806 in relation to descriptors 210 of smooth boundaries 204 of a smooth image. FIGS. 5-7 depict a single descriptor 210, and the text for those figures focuses on describing how to determine this single crossing location for each blocky boundary between active and inactive pixel blocks. Multiple descriptors 210 can be determined. This approach can be enhanced by including a directional indicator 806 in addition to the descriptor 210. In other words, the smooth boundaries 204 can be constructed more accurately using a combination of the descriptor 210, which may be computed from a positional indicator 208, and the directional indicator 806. With implementations that utilize a directional indicator 806, an example of a function to be learned is: F(Blocky Boundary)→(positional indicator, directional indicator).

The directional indicator 806 may be implemented, for example, as a normal to the smooth object. Incorporating the normal into the reconstruction enables a more accurate reproduction of various smooth boundaries 204, especially with regard to achieving accurate angles for corners between two smooth boundaries 204. However, the normals are also helpful for straight regions because Hermite interpolation can be employed. Using a combination of the descriptor 210 and the directional indicator 806 further facilitates construction of a precise geometric representation of the smooth boundaries 204 of the smooth image, including corners and curves thereof.

The description above for FIGS. 3-7 and 9-11 focuses on de-pixelization in a 2D environment. These principles, however, may be extended to de-voxelization in a 3D environment. In the description above, the blocky boundary is shown as a blocky interface edge in two dimensions. In two dimensions, the function to learn is therefore: F(Blocky_Boundary_Edge)→Crossing Indication. In three dimensions, the blocky boundary becomes a blocky interface surface. Thus, rather than encoding a single line that is representative of an object's edge, a patch that is representative of an object's surface is encoded around a given block or point. Hence, the function to learn in 3D is: F(Blocky_Boundary_Surface)→Crossing Indication. The blocky boundary patch is a patch on the surface of the object, and the crossing indication gives the location where the smooth surface crosses the result. Just as a 2D plane may be considered to include multiple 1D lines, a boundary patch, as a 3D construct, may be considered to include multiple boundary edges, which are 2D constructs.

Having discussed example details of systems and techniques for smoothing images using machine learning, consider now some example procedures to illustrate additional aspects of the techniques.

Example Procedures

Figure 12:
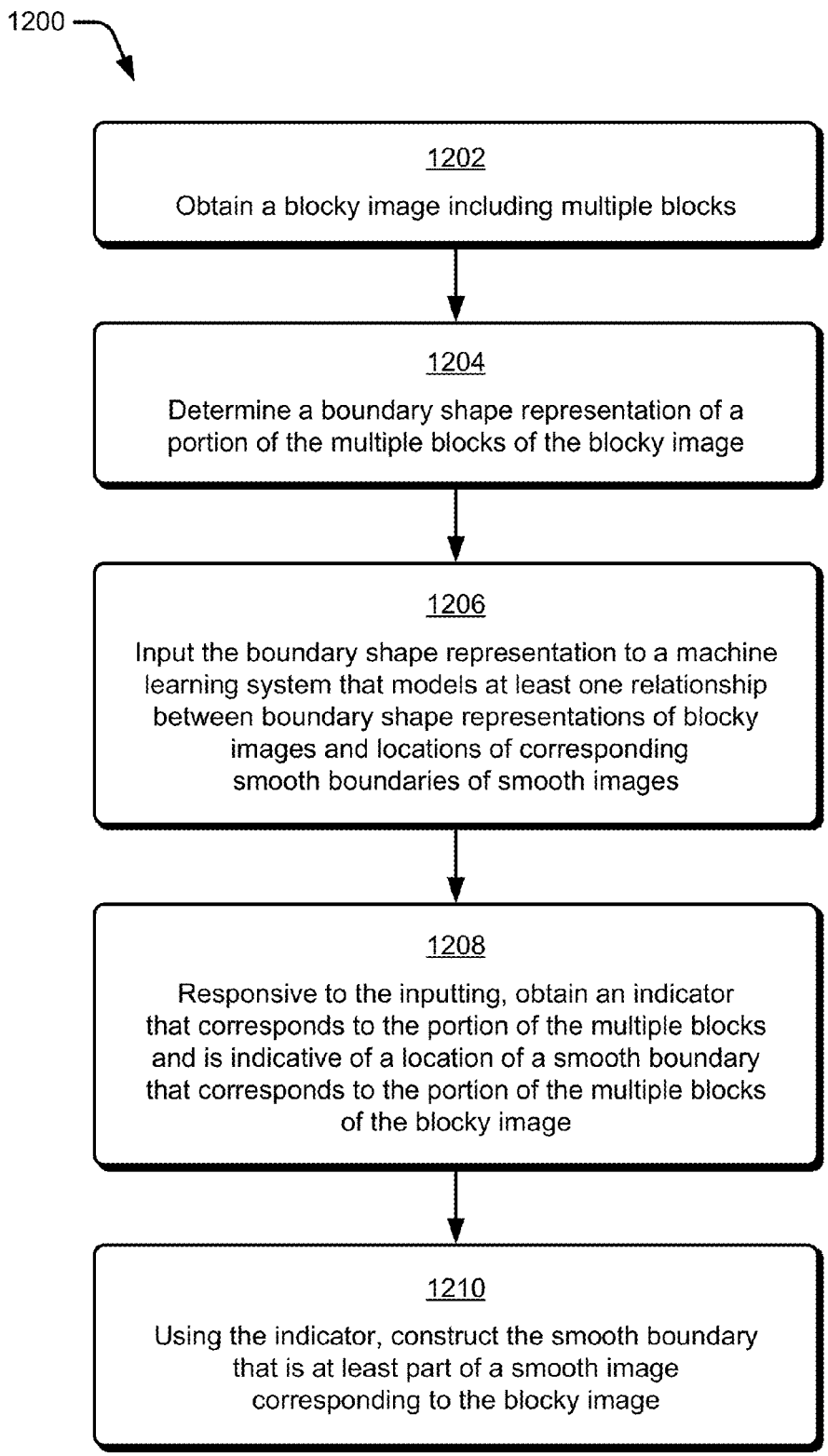
FIG. 12 is a flow diagram illustrating an example procedure in accordance with one or more example embodiments.
Figure 13:
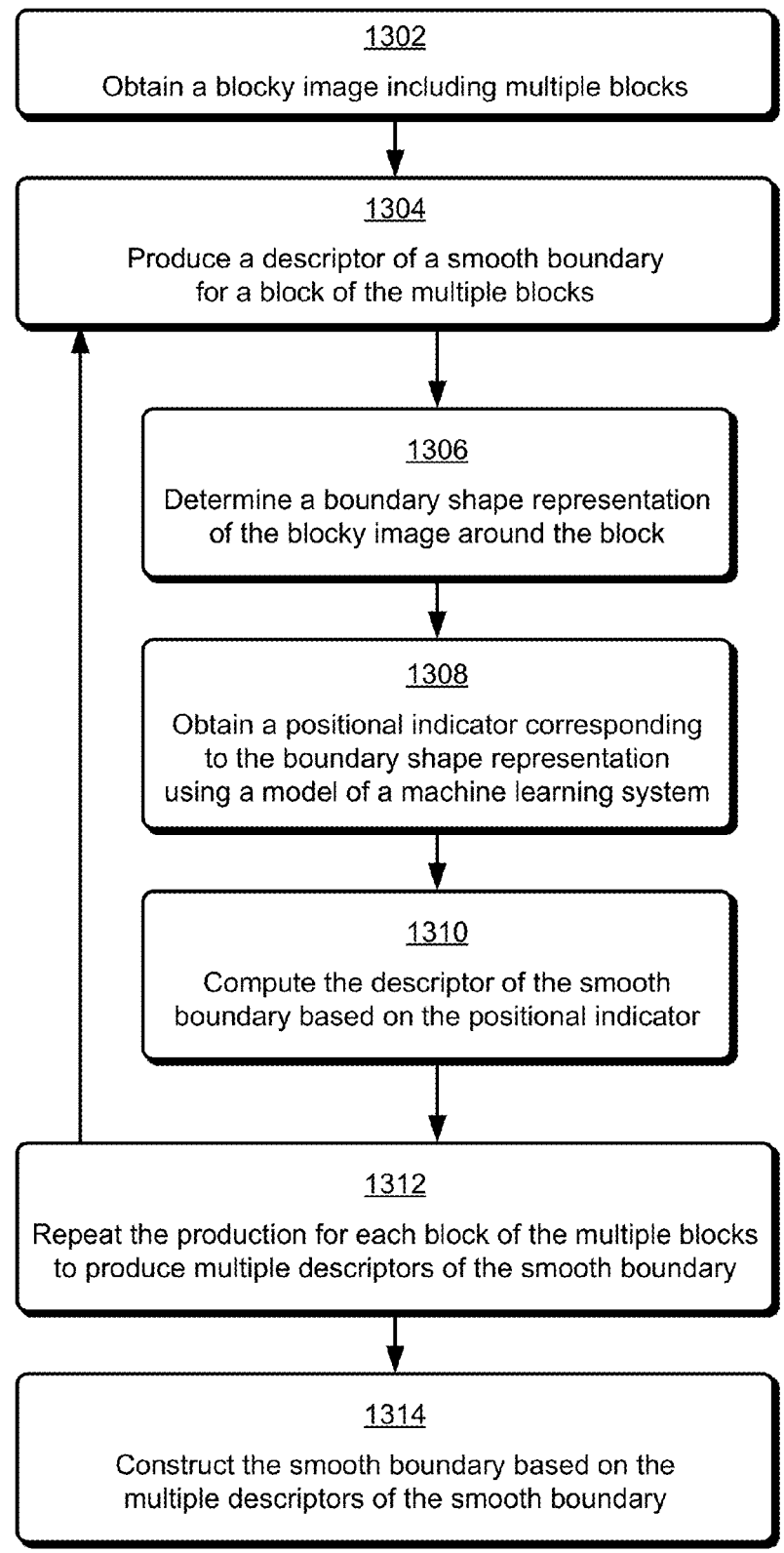
FIG. 13 is another flow diagram illustrating another example procedure in accordance with one or more example embodiments.
Figure 14:
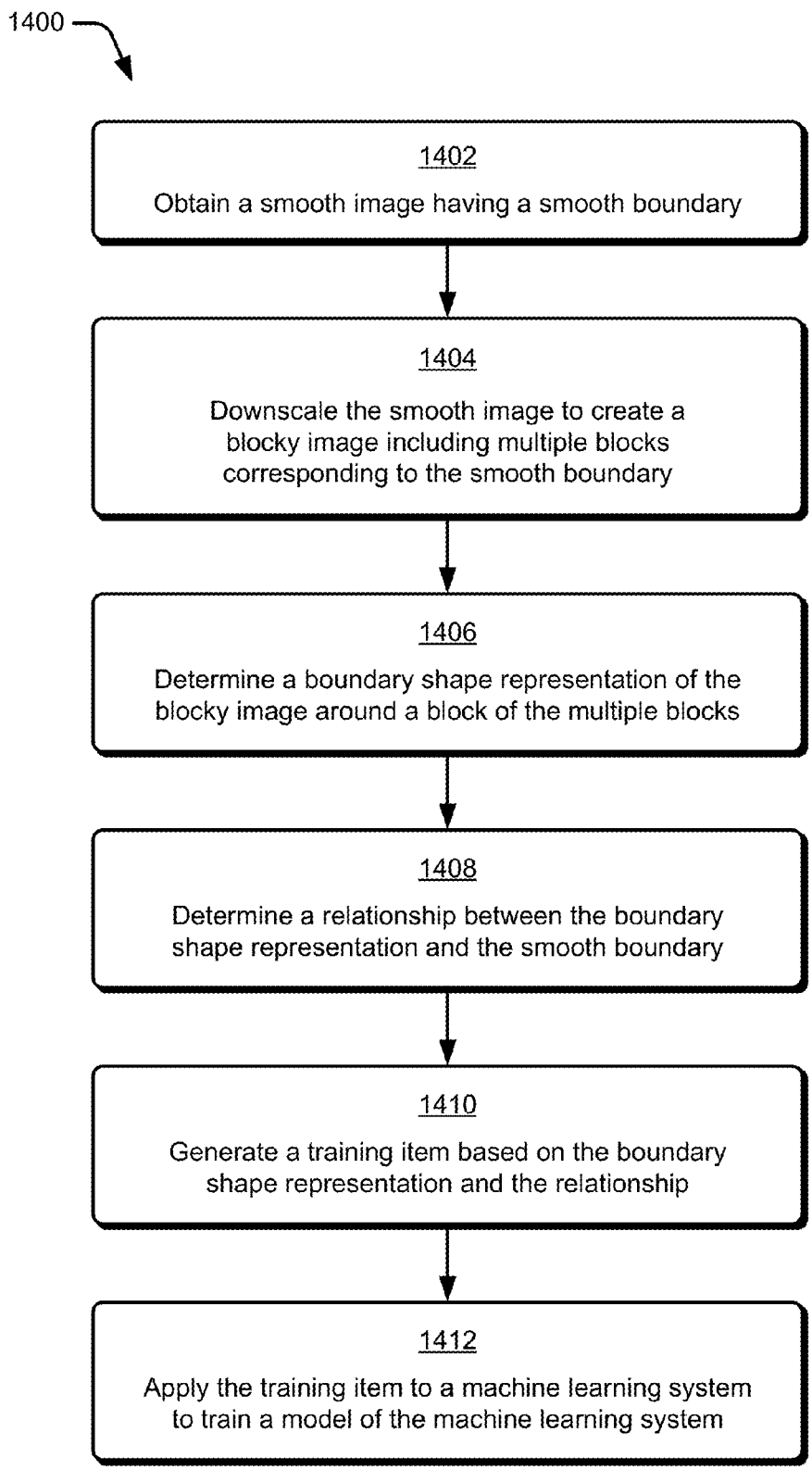
FIG. 14 is yet another flow diagram illustrating yet another example procedure in accordance with one or more example embodiments.

This section describes with reference to FIGS. 12-14 example procedures relating to smoothing images using machine learning in one or more embodiments. The procedures of FIGS. 12 and 13 relate to using a trained machine learning system to smooth an image. The procedure of FIG. 14 relates to training a machine learning system to be used to smooth an image. Aspects of the procedures may be implemented in hardware, firmware, or software, or a combination thereof. The procedures are shown as a set of blocks that specify operations that may be performed by one or more devices, but performance of the operations is not necessarily limited to the orders as shown by the respective blocks or as described herein, for the operations may be performed in other orders or in fully or partially overlapping manners. In at least some embodiments, the procedures may be performed by a suitably configured device, such as an example computing device 102 (e.g., of FIG. 1) that makes use of an image smoothing module 104, a machine learning system 106, a machine learning training module 808, or a combination thereof.

FIG. 12 is a flow diagram 1200 that includes five blocks 1202-1210 and that illustrates an example procedure for constructing at least part of a smooth image in accordance with one or more example embodiments. At block 1202, a blocky image including multiple blocks is obtained. For example, an image smoothing module 104 may obtain a blocky image 118 including multiple blocks 202. For instance, an image smoothing module 104 may access a file that defines a 3D virtual world having multiple voxels placed in a 3D grid as textured cubes by a participant of a modeling game.

At block 1204, a boundary shape representation is determined using a portion of the multiple blocks of the blocky image. For example, the image smoothing module 104 may determine a boundary shape representation 206 using a portion of the multiple blocks 202 of the blocky image 118. To do so, a blocky boundary patch around a selected block 202* that extends to a given neighborhood size may be encoded into a feature vector 214.

At block 1206, the boundary shape representation is input to a machine learning system that models at least one relationship between boundary shape representations of blocky images and locations of corresponding smooth boundaries of smooth images. For example, the image smoothing module 104 may input the boundary shape representation 206 to a machine learning system 106 that models at least one relationship between boundary shape representations 206 of blocky images 118 and locations of corresponding smooth boundaries 204 of smooth images 120. The feature vector 214 may, for instance, be transmitted to a machine learning system 106 located "in the cloud" or input to a local machine learning system 106. The machine learning system 106 includes a model 810 that incorporates a learned relationship between (i) a characteristic 122 of part of a blocky image 118 and (ii) a relationship expression 124 between a blocky boundary of the blocky image 118 and a smooth boundary of a smooth image 120.

At block 1208, responsive to the inputting, an indicator that corresponds to the portion of the multiple blocks and that is indicative of a location of a smooth boundary that corresponds to the portion of the multiple blocks of the blocky image is obtained. For example, responsive to the inputting of the boundary shape representation 206, the image smoothing module 104 may obtain from the machine learning system 106 a positional indicator 208 or a directional indicator 806 that is indicative of a location of a smooth boundary 204 that corresponds to the portion of the multiple blocks 202 of the blocky image 118. The image smoothing module 104 may receive an indicator via a network from a remote machine learning system 106 or produce an indicator from a local machine learning system 106, with the indicator indicative of a distance from some aspect of a block 202, such as a center 402 of the block 202, to the smooth boundary 204.

At block 1210, using the indicator, the smooth boundary that is at least part of a smooth image corresponding to the blocky image is constructed. For example, using the positional indicator 208 or the directional indicator 806, the image smoothing module 104 may construct the smooth boundary 204 that is at least part of a smooth image 120 that corresponds to the blocky image 118. To effectuate a construction of at least a smooth boundary 204 of a smooth image 120, the image smoothing module 104 may compute a descriptor 210 of the smooth boundary 204 using a location of the selected block 202* and a distance included as part of the positional indicator 208. The constructed part of the smooth image 120 may be defined using a precise geometric representation.

FIG. 13 is a flow diagram 1300 that includes eight blocks 1302-1314 and that illustrates another example procedure for constructing at least part of a smooth image in accordance with one or more example embodiments. At block 1302, a blocky image including multiple blocks is obtained. For example, an image smoothing module 104 may obtain a blocky image 118 including multiple blocks 202. For instance, the image smoothing module 104 may be provided the blocky image 118 from another application with the blocky image 118 depicting at least one object having a jagged appearance.

At block 1304, for a block of the multiple blocks, a descriptor of a smooth boundary is produced. For example, for a selected block 202* of the multiple blocks 202, the image smoothing module 104 may produce a descriptor 210 of a smooth boundary 204. To do so, the image smoothing module 104 may access a machine learning system 106 that retains knowledge of how blocky images are intended to appear as smooth images. The operations of blocks 1306-1310 are performed to effectuate the production of the descriptor 210.

At block 1306, a boundary shape representation of the blocky image around the block is determined. For example, the image smoothing module 104 may determine a boundary shape representation 206 of the blocky image 118 around the selected block 202*. To do so, coordinate points along an object interface in a neighborhood around an origin point 702 of the selected block 202* may be determined.

At block 1308, a positional indicator corresponding to the boundary shape representation is obtained using a model of a machine learning system. For example, the image smoothing module 104 may obtain a positional indicator 208 that corresponds to the boundary shape representation 206 using a model 810 of a machine learning system 106. The image smoothing module 104 may, for instance, provide a feature vector 214, which includes the determined coordinate points along the object interface, to the machine learning system 106. In response to the input feature vector 214 and based on the model 810, the machine learning system 106 may return the positional indicator 208 that comports with the features included in the feature vector 214 in accordance with at least one machine learning technique, such as a neural network, that is used to produce the model 810.

At block 1310, the descriptor of the smooth boundary is computed based on the positional indicator. For example, the image smoothing module 104 may compute the descriptor 210 of the smooth boundary 204 based on the positional indicator 208. To effectuate the computation, the image smoothing module 104 may determine a crossing location between two adjacent blocks of the smooth boundary 204 using a distance of the positional indicator 208 along with a location of the selected block 202*.

At block 1312, for each block of the multiple blocks, the descriptor production is repeated to produce multiple descriptors of the smooth boundary. For example, the image smoothing module 104 may repeat the production of the descriptor 210 by repeating the operations of the blocks 1306-1310 for each block 202 of the multiple blocks 202 to produce multiple descriptors 210 of the smooth boundary 204. To do so, the image smoothing module 104 may shift the production analysis over by one block 202 and determine a boundary shape representation 206 anew until a descriptor collection 212 is generated.

At block 1314, the smooth boundary is constructed based on the multiple descriptors of the smooth boundary. For example, the image smoothing module 104 may construct the smooth boundary 204 based on the multiple descriptors 210 of the smooth boundary 204 as produced at block 1312. To construct the smooth boundary 204, the descriptors 210 of the descriptor collection 212 may be interconnected with line segments, colors, surface portions, textures, or a combination thereof. The smooth boundary 204 may be constructed in terms of a precise geometric representation, such as by using vectors to produce a vector form of the smooth boundary 204.

FIG. 14 is a flow diagram 1400 that includes six blocks 1402-1412 and that illustrates an example procedure for building a machine learning system usable to facilitate the smoothing of an image in accordance with one or more example embodiments. At block 1402, a smooth image having a smooth boundary is obtained. For example, a machine learning training module 808 may obtain a smooth image 120 having a smooth boundary 204. Publicly available images that have been hand drawn or manually adjusted to have curves and lines that meet at random angles may be obtained, for instance. The smooth image 120, or the smooth boundary 204 thereof, may be obtained in a precise geometric representation form.

At block 1404, the smooth image is downscaled to create a blocky image including multiple blocks corresponding to the smooth boundary. For example, the machine learning training module 808 may downscale the smooth image 120 to create a blocky image 118 including multiple blocks 202 corresponding to the smooth boundary 204. To do so, the smooth image 120 may be rasterized to pixelate or voxelate the image.

At block 1406, a boundary shape representation of the blocky image is determined around a block of the multiple blocks. For example, the machine learning training module 808 may determine a boundary shape representation 206 of the blocky image 118 around a selected block 202* of the multiple blocks 202. To effectuate a determination, a shape of an interface of an object between active blocks and inactive blocks may be encoded.

At block 1408, a relationship is determined between the block and the smooth boundary. For example, the machine learning training module 808 may determine a relationship expression 124 for the selected block 202* and the smooth boundary 204. The machine learning training module 808 may, for instance, determine a positional indicator 208 including a distance between some aspect of the selected block 202*, such as a center 402 thereof, and the smooth boundary 204.

At block 1410, a training item is generated based on the boundary shape representation and the relationship. For example, the machine learning training module 808 may generate a training item 802 based on the boundary shape representation 206 and the relationship expression 124. To do so, the boundary shape representation 206 may be associated with the relationship expression 124, such as the positional indicator 208 or a directional indicator 806.

At block 1412, the training item is applied to a machine learning system to train a model of the machine learning system to facilitate image smoothing. For example, the machine learning training module 808 may apply the training item 802 to a machine learning system 106 to train a model 810 of the machine learning system 106 to facilitate an image smoothing operation 112. To effectuate the training, the machine learning training module 808 inputs the training item 802 and processes the training item 802 in accordance with at least one machine learning technique, such as a regression technique.

Having described example procedures in accordance with one or more embodiments, consider now an example system and device that can be utilized to implement the various techniques described herein.

Example Reconstructions and Results

This section describes example approaches to reconstructions when smoothing images using machine learning. One example approach is an offline reconstruction. In a 2D black and white scenario, after learning the function F( ), a smooth shape can be reconstructed from 2D black and white pixelated art. For each open edge of the 2D pixelated art, a crossing location is computed, and the results are connected to form a polyline.

Another example approach is an online reconstruction. Images may be smoothed, for instance, in an interactive setting. In this situation, a smooth version of existing pixelated art has been computed using the offline reconstruction described above. If a user decides to change the art by updating a single pixel, this change does not globally impact the artwork. Consequently, computational updates can be restricted to a region that is impacted by the changed pixel. A size of this region is governed by a length used for a 2D boundary shape representation (e.g., a size of a neighborhood considered around a selected block). The greater the length is, the more computation is involved to update the artwork. At the same time, using a larger-sized region enables smoother content to be reconstructed, such as accurately reconstructing boundaries that are at relatively shallow angles. In other words, a larger neighborhood provides for a better reconstruction, but the larger neighborhood demands a higher computational cost during online updates. With 2D scenarios, modern computing power may enable full-image smoothing to be performed in real-time. With 3D scenarios, on the other hand, especially those involving large virtual worlds with many voxels, constraining image updates to a local neighborhood around a changed voxel may be beneficial if the computing cost of reevaluating the entire virtual world is otherwise too expensive or time consuming.

Figure 15:
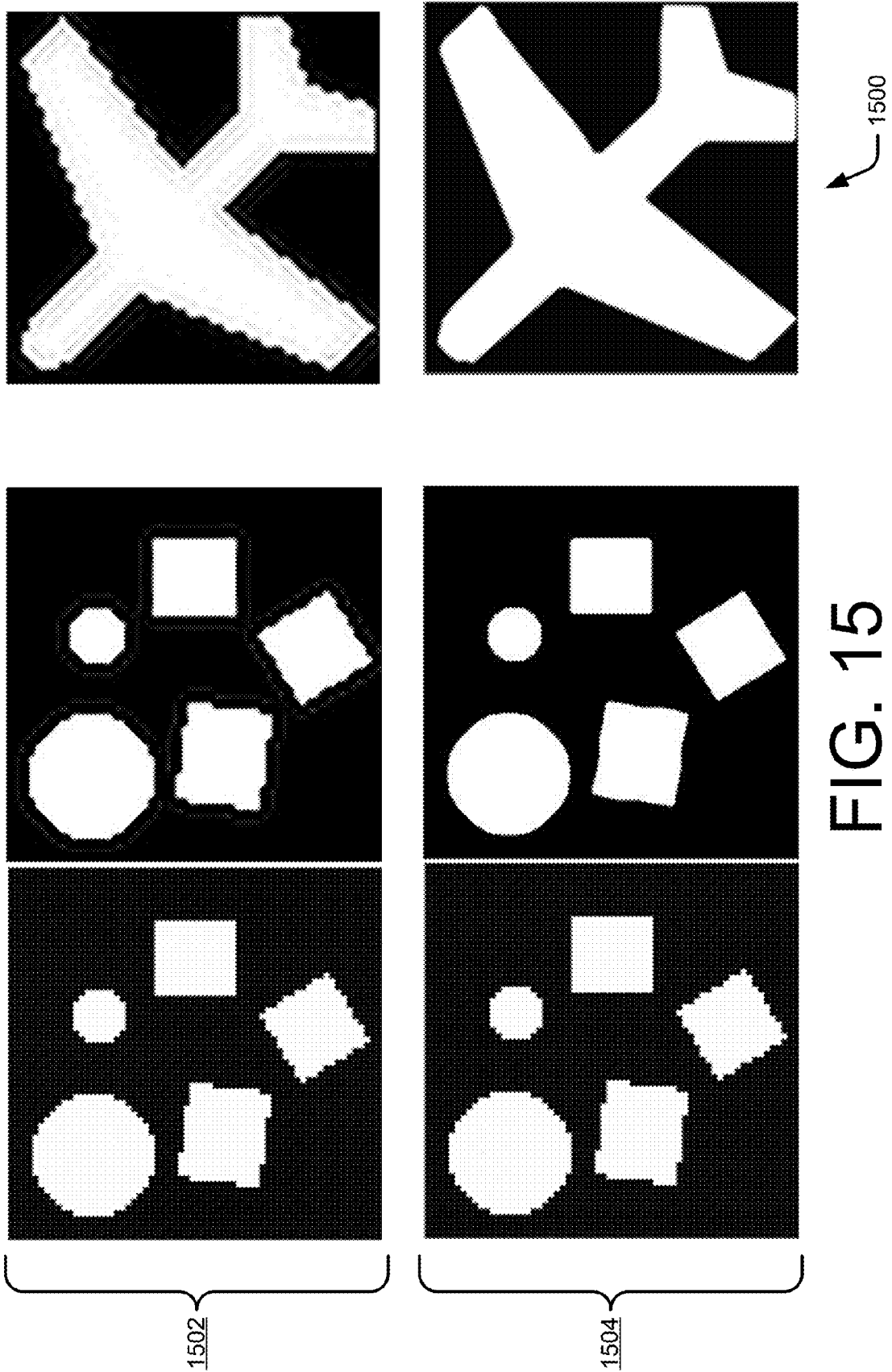
FIG. 15 depicts for comparison purposes examples of image smoothing via a conventional technique versus a technique using machine learning as described herein.

FIG. 15 depicts at 1500 generally examples of image smoothing via a conventional approach and via an approach using machine learning as described herein for comparison purposes. An upper row 1502 corresponds to image smoothing via the conventional approach. A lower row 1504 corresponds to image smoothing via an approach using machine learning as described herein. The first column of images on the left, for both the upper row 1502 and the lower row 1504, has black and white pixelated or blocky images of squares and circles. After super-resolution or image upscaling, with the conventional approach, the jagged boundaries are not fully resolved, as shown in the middle column of the upper row 1502.

For an example of the machine learning approach as described herein, a nearest-neighbor machine learning technique was employed to construct a higher resolution version. The resulting smooth image reconstruction as shown in the middle column of the lower row 1504 reveal that sloped boundaries were effectively recognized and converted into straight lines. Furthermore, the pixels that lie along the boundary of the blocky circles were converted into nearly perfect circles.

The last column of images on the right, for both the upper row 1502 and the lower row 1504, shows smoothed images of an airplane. The plane in the upper row 1502 is the result of a smoothing operation using a conventional approach. The plane in the lower row 1504, on the other hand, is the result of a smoothing operation using an example of the machine learning approach as described herein. Both approaches used a neural network technique to realize the super-resolution. As is apparent from the last column of FIG. 15, the plane in the lower row 1504 that results from the machine learning approach has smoother boundaries.

Example System and Device

Figure 16:
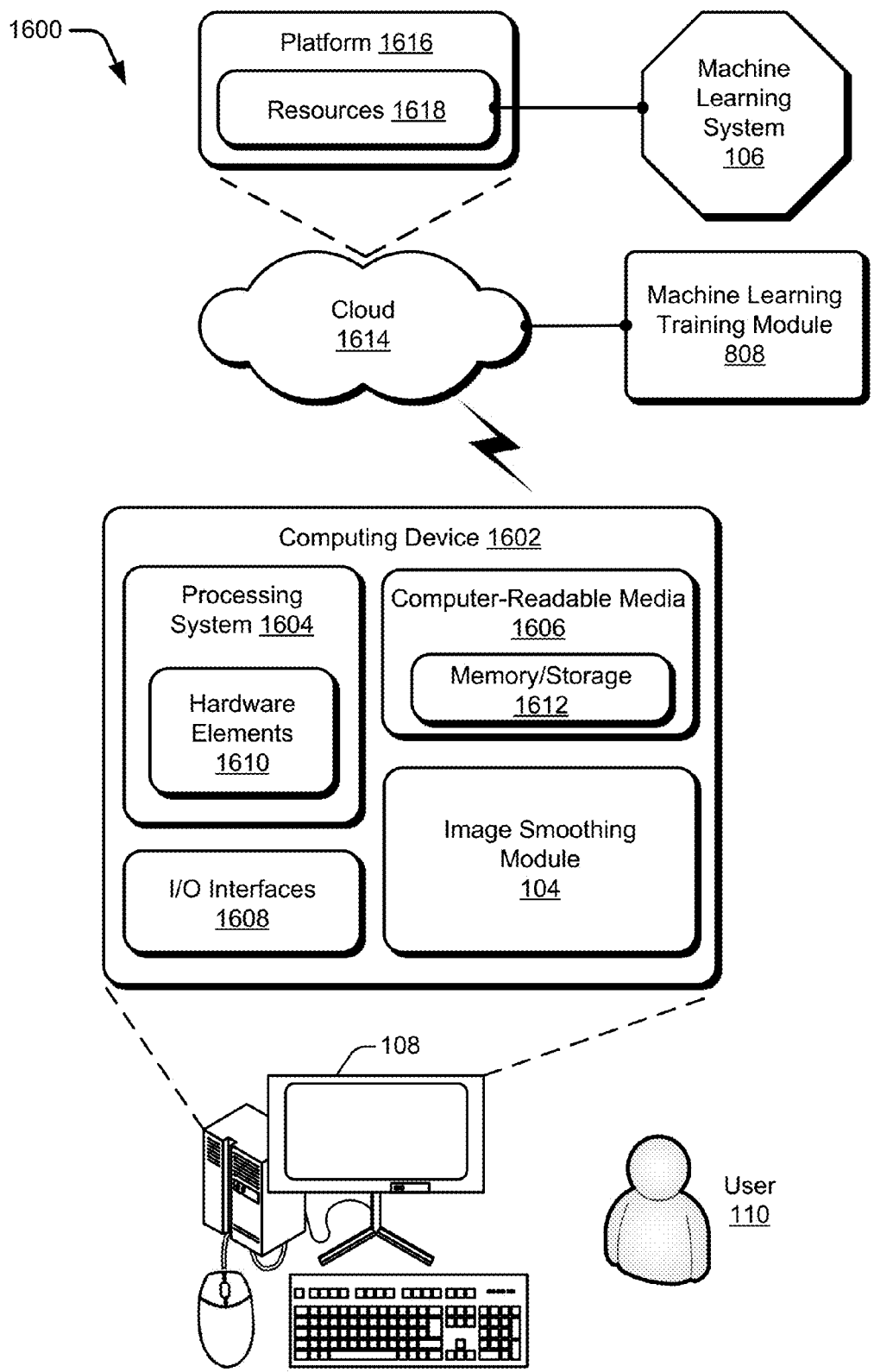
FIG. 16 illustrates an example system including various components of an example device that can be employed for one or more embodiments of smoothing images using machine learning.

FIG. 16 illustrates an example system generally at 1600 that includes an example computing device 1602 that is representative of one or more computing systems or computing devices that may implement the various techniques described herein. This is illustrated through inclusion of an image smoothing module 104, a machine learning system 106, and a machine learning training module 808, any of which may operate as described herein above. A computing device 1602 may be implemented as, for example, a computing device 102 (of FIG. 1) that is coupled to a display 108 for a user 110. Generally, a computing device 1602 may be implemented as, for example, an end-user device (e.g., a client side device) of a user 110, a corporate device (e.g., a server side device or data center hardware), an on-chip system or system-on-a-chip (SOC), or any other suitable computing device or computing system.

In an example implementation as shown in FIG. 1, the image smoothing module 104 and the machine learning system 106 are present or executing together at one location, and the machine learning training module 808 (not explicitly shown in FIG. 1) may also be so co-located. In an example implementation as shown in FIG. 16, on the other hand, the image smoothing module 104 is executing on a client-side computing device and the machine learning system 106, as well as the machine learning training module 808, is located remotely in the cloud. The image smoothing module 104 may access the machine learning system 106 remotely via at least one network, such as the internet, in such an implementation. Other approaches to locating or executing the image smoothing module 104 or the machine learning training module 808 with respect to the machine learning system 106 may alternatively be implemented.

The example computing device 1602 as illustrated includes at least one processing system 1604, one or more computer-readable media 1606, and one or more I/O interfaces 1608 that are communicatively coupled, one to another. Although not explicitly shown, the computing device 1602 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 1604 is representative of functionality to perform one or more operations using hardware. Accordingly, the processing system 1604 is illustrated as including one or more hardware elements 1610 that may be implemented as processors, functional blocks, and so forth. This may include implementation in hardware as an application specific integrated circuit (ASIC), a general-purpose processor, or other logic device formed using e.g. one or more semiconductors. The hardware elements 1610 are not limited by the materials from which they are formed or the processing mechanisms employed therein. For example, processors may include or may be realized with semiconductor(s) or transistors (e.g., electronic integrated circuits (ICs)). In such a context, processor-executable instructions may comprise electronically-executable instructions.

The computer-readable storage media 1606 is illustrated as including memory/storage 1612. The memory/storage 1612 represents memory/storage capacity associated with one or more computer-readable media. The memory/storage component 1612 may include volatile media (e.g., random access memory (RAM)) or nonvolatile media (e.g., read only memory (ROM), flash memory, optical discs, or magnetic disks). The memory/storage component 1612 may include fixed media (e.g., RAM, ROM, or a fixed hard drive) or removable media (e.g., a flash memory card, a removable hard drive, or an optical disc). The computer-readable media 1606 may be implemented in a variety of other ways as further described below.

The input/output interface(s) 1608 are representative of functionality to allow a user to enter commands or information to computing device 1602 or to allow information to be presented to the user, or other components or devices using various input/output devices. Examples of input devices include a keyboard, a cursor control device (e.g., a mouse or touchpad), a microphone, a scanner, touch functionality (e.g., capacitive, resistive, or other sensors that are implemented to detect physical touch), a camera (e.g., which may employ visible or non-visible wavelengths such as infrared frequencies to recognize movement as gestures that need not involve touch), an accelerometer, or a combination thereof. Examples of output devices include a display device (e.g., an LCD or LED screen, a monitor, or a projector), a speaker, a printer, a network card, a haptic vibrating device, or a combination thereof. Thus, the computing device 1602 may be implemented in a variety of ways as further described below to support local or remote user interaction.

Various techniques may be described herein in the general context of software, hardware elements, or program modules. Generally, such modules may include routines, programs, objects, elements, components, data structures, combinations thereof, and so forth that perform particular tasks or implement particular abstract data types. The terms "module," "functionality," and "component" as used herein generally represent software, firmware, hardware, or a combination thereof. The features of the techniques described herein may be platform-independent, meaning that the described techniques may be implemented on a variety of commercial computing platforms having a variety of processors.

An embodiment of the described modules, and techniques thereof, may be stored on or transmitted across some form of computer-readable media. The computer-readable media 1606 may include a variety of media that may be accessed by the computing device 1602. By way of example, and not limitation, computer-readable media may include "computer-readable storage media" and "computer-readable signal media."

"Computer-readable storage media," as used herein, refers to media or devices that enable persistent and/or non-transitory storage of information in contrast to mere signal transmission, carrier waves, or signals per se. Computer-readable storage media does not include signals per se or signal bearing media. The computer-readable storage media includes hardware such as volatile and non-volatile, removable and non-removable media or storage devices implemented in a process or technology suitable for storage of information, such as computer readable instructions, data structures, program modules, logic elements/circuits, or other data. Examples of computer-readable storage media may include, but are not limited to, RAM, ROM, EEPROM, flash memory, or other e.g. solid state memory technology; CD-ROM, digital versatile discs (DVD), or other optical storage; hard disks, magnetic cassettes, magnetic tape, magnetic disk storage, or other magnetic storage devices; or another storage device, tangible medium, article of manufacture, or combination thereof that is suitable to store desired information and that may be accessed by a computer.

"Computer-readable signal media," as used herein, refers to a signal-bearing medium that is implemented to transmit instructions to hardware of the computing device 1602, such as via a network. Computer-readable signal media typically may embody computer readable instructions, data structures, program modules, or other data in a modulated data signal, such as carrier waves, data signals, or another transport mechanism. Computer-readable signal media may also include any information delivery media. The term "modulated data signal" means a signal that has one or more of its characteristics set or changed in such a manner as to encode information in the signal. By way of example, but not limitation, computer-readable signal media may include wired media, such as a wired network or direct-wired connection, or wireless media, such as acoustic, RF, microwave, infrared, or other wireless media.

As previously described, hardware elements 1610 and computer-readable media 1606 may be representative of modules, programmable device logic, fixed device logic, a combination thereof, and so forth that is implemented in a hardware form that may be employed in some embodiments to implement at least some aspects of the techniques described herein, such as to perform one or more instructions or computing actions. Hardware may include components of an integrated circuit (IC) or on-chip system, an application-specific integrated circuit (ASIC), a field-programmable gate array (FPGA), a complex programmable logic device (CPLD), or other implementations in silicon or other hardware. In this context, hardware may operate as a processing device that performs program tasks defined by instructions or logic embodied by the hardware as well as hardware utilized to store instructions for execution, e.g., the computer-readable storage media described previously.

Combinations of the foregoing may also be employed to implement various techniques described herein. Accordingly, software, hardware, or executable modules may be implemented as one or more instructions or logic embodied on some form of computer-readable storage media or by one or more hardware elements 1610. The computing device 1602 may be configured to implement particular instructions or functions corresponding to software or hardware modules. Accordingly, implementation of a module that is executable by the computing device 1602 as software may be achieved at least partially in hardware, e.g., through use of computer-readable storage media or the hardware elements 1610 of the processing system 1604. The instructions or functions may be executable/operable by one or more articles of manufacture (e.g., one or more computing devices 1602 or processing systems 1604) to implement techniques, modules, or examples described herein.

The techniques described herein may be supported by various configurations of the computing device 1602 and are not limited to the specific aspects of the example devices described herein. This functionality may also be implemented fully or partially through use of a distributed system, such as over a "cloud" 1614 via a platform 1616 as described below.

The cloud 1614 may include or represent a platform 1616 for resources 1618. The platform 1616 abstracts underlying functionality of hardware (e.g., one or more servers or at least one data center) and software resources of the cloud 1614. The resources 1618 may include applications or data that can be utilized while computer processing is at least partially executed on servers that are remote from, or distributed around, the computing device 1602. Resources 1618 may also include services provided over the Internet or through a subscriber network, such as a cellular or Wi-Fi network.

The platform 1616 may abstract resources and functions to connect the computing device 1602 with other computing devices or services. The platform 1616 may also serve to abstract a scaling of resources to provide a corresponding level of scale to encountered demand for the resources 1618 that are implemented via the platform 1616. Accordingly, in an interconnected device embodiment, implementation of functionality described herein may be distributed throughout the illustrated system of FIG. 16, or at least throughout the cloud 1614 along with the computing device 1602. For example, functionality may be implemented in part on the computing device 1602 as well as via the platform 1616 that abstracts the functionality of the cloud 1614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computing device implemented at least partially in hardware operative in a digital environment in which blocky images at a relatively lower resolution can be converted to corresponding smooth images at a relatively higher resolution, the computing device comprising:
   an image smoothing module implemented by a processor, the image smoothing module configured to perform operations comprising:
      obtaining a blocky image including multiple blocks;
      determining a boundary shape representation of a portion of the multiple blocks of the blocky image;

inputting the boundary shape representation to a machine learning system that models at least one relationship between boundary shape representations of blocky images and locations of corresponding smooth boundaries of smooth images;

responsive to the inputting, obtaining an indicator that corresponds to the portion of the multiple blocks and is indicative of a location of a smooth boundary that corresponds to the portion of the multiple blocks of the blocky image; and using the indicator, constructing the smooth boundary that is at least part of a smooth image corresponding to the blocky image; and a display device configured to present the smooth boundary.

2. The computing device as described in claim 1, wherein:

the portion of the multiple blocks of the blocky image comprises a neighborhood around a block of the multiple blocks;

the determining comprises determining a feature vector that captures the boundary shape representation of the neighborhood around the block of the multiple blocks; and the inputting comprises inputting the feature vector to the machine learning system.

3. The computing device as described in claim 1, further comprising:

the machine learning system configured to produce a model using a training set including multiple training items, each training item of the multiple training items including a boundary shape representation of a blocky training image and an associated indicator for a smooth boundary of a corresponding smooth training image, the associated indicator indicative of a location of the smooth boundary of the smooth training image that corresponds to the boundary shape representation of the blocky training image.

4. The computing device as described in claim 1, wherein:

the indicator is representative of a relationship between the portion of the multiple blocks of the blocky image and the smooth boundary of the smooth image; and the constructing comprises ascertaining a location of the smooth boundary based on the indicator.

5. The computing device as described in claim 4, wherein:

the indicator comprises a positional indicator;

the obtaining comprises obtaining from the machine learning system a directional indicator that corresponds to the portion of the multiple blocks and is indicative of an angle of the smooth boundary that corresponds to the portion of the multiple blocks of the blocky image; and the constructing comprises ascertaining the location of the smooth boundary based on the positional indicator and the directional indicator.

6. The computing device as described in claim 1, wherein the inputting comprises transforming the boundary shape representation of the blocky image or at least the portion of the multiple blocks of the blocky image to accommodate a symmetrical property incorporated into the machine learning system.

7. The computing device as described in claim 1, wherein the multiple blocks comprise multiple voxels, and the portion of the multiple blocks comprises a surface patch around a voxel of the multiple voxels.

8. A method implemented by at least one computing device to de-blockify an image in a digital environment in which blocky images at a relatively lower resolution can be converted to corresponding smooth images at a relatively higher resolution, the method comprising:

obtaining a blocky image including multiple blocks;

for a block of the multiple blocks, producing a descriptor of a smooth boundary by:

determining a boundary shape representation of the blocky image around the block;

obtaining a positional indicator corresponding to the boundary shape representation using a model of a machine learning system; and computing the descriptor of the smooth boundary based on the positional indicator;

repeating the producing for each block of the multiple blocks to produce multiple descriptors of the smooth boundary; and constructing the smooth boundary based on the multiple descriptors of the smooth boundary.

9. The method as described in claim 8, wherein:

the constructing comprises constructing multiple smooth boundaries; and the method further comprises constructing a smooth image based on the multiple smooth boundaries, the smooth image corresponding to the blocky image.

10. The method as described in claim 9, further comprising:

presenting the blocky image on a display coupled to the at least one computing device; and presenting the smooth image on the display coupled to the at least one computing device.

11. The method as described in claim 9, wherein:

the multiple blocks are located on are exterior of the blocky image;

the obtaining further comprises obtaining a directional indicator associated with the boundary shape representation using the model of the machine learning system; and the constructing the smooth image comprises constructing a corner of the smooth image based on the directional indicator.

12. The method as described in claim 8, wherein:

the boundary shape representation comprises multiple coordinates encoded into a feature vector; and the obtaining comprises inputting the feature vector to the machine learning system.

13. The method as described in claim 8, further comprising:

transforming the blocky image or the boundary shape representation to accommodate geometrical symmetry prior to the obtaining.

14. The method as described in claim 8, wherein the blocks of the multiple blocks comprise respective pixels that are active, including the block comprising a pixel that is active; the boundary shape representation comprises a, polyline that is representative of a boundary edge between pixels of the blocky image that are active and inactive pixels; and the positional indicator comprises a scalar value that is expressed relative to a center of the pixel that is active.

15. At least one computing device operative in a digital environment in which blocky images at a relatively lower resolution can be converted to corresponding smooth images at a relatively higher resolution, the at least one computing device including a processor and at least one computer-readable storage medium, the at least one computing device configured to perform operations comprising:

obtaining a smooth image having a smooth boundary;

downscaling the smooth image to create a blocky image including multiple blocks corresponding to the smooth boundary;

determining a boundary shape representation of the blocky image around a block of the multiple blocks;

determining a relationship between the block and the smooth boundary;

generating a training item based on the boundary shape representation and the relationship; and applying the training item to a machine learning system to train a model of the machine learning system to facilitate image smoothing.

16. The at least one computing device as described in claim 15, wherein the at least one computing device is configured to perform operations further comprising:

rotating the blocky image at multiple angles;

shifting the blocky image at multiple sub-block intervals; and repeating the determining a boundary shape representation, the determining a relationship, the generating a training item, and the applying the training item for the multiple angles and for the multiple sub-block intervals.

17. The at least one computing device, as described in claim 15, wherein:

the relationship comprises a positional indicator representative of a distance between the block and the smooth boundary; and the determining the relationship comprises determining the distance between the block and the smooth boundary.

18. The at least one computing device as described in claim 15, wherein the at least one computing device is configured to perform operations further comprising:

determining a normal to the smooth boundary in a region corresponding to the block;

wherein the generating comprises associating the boundary shape representation with the relationship and with the normal to the smooth boundary to produce the training item.

19. The at least one computing device as described in claim 15, wherein:

the boundary shape representation comprises at least a boundary edge of the blocky image; and the determining the boundary shape representation comprises determining the at least a boundary edge of the blocky image in a neighborhood around the block of the multiple blocks.

20. The at least one computing device as described in claim 19, wherein:

the at least a boundary edge of the blocky image comprises a boundary surface patch of the blocky image;

the determining the at least a boundary edge of the blocky image comprises determining the boundary surface patch of the blocky image in the neighborhood around the block of the multiple blocks; and a quality of the image smoothing that can be provided by the machine learning system depends at least partially on a size of the neighborhood around the block of the multiple blocks.

* * * * *

UNITED STATES PATENT AND TRADEMARK OFFICE
CERTIFICATE OF CORRECTION

PATENT NO. : 9,799,102 B2  
APPLICATION NO. : 14/957539  
DATED : October 24, 2017  
INVENTOR(S) : Carr et al.

Page 1 of 1

It is certified that error appears in the above-identified patent and that said Letters Patent is hereby corrected as shown below:

In the Claims

Column 26, Line 32, after "blocks are located on", delete "are", insert -- an --, therefor.

Column 26, Line 56, after "representation comprises a", delete ",", therefor.

Column 27, Line 24, after "computing device", delete ",", therefor.

Column 28, Line 5, after "block", delete ";", insert -- , --, therefor.

Signed and Sealed this  
Twenty-sixth Day of December, 2017

Joseph Matal  
*Performing the Functions and Duties of the*  
*Under Secretary of Commerce for Intellectual Property and*  
*Director of the United States Patent and Trademark Office*